(12) United States Patent
Chen et al.

(10) Patent No.: US 11,368,539 B1
(45) Date of Patent: Jun. 21, 2022

(54) APPLICATION DEPLOYMENT IN A MULTI-CLUSTER ENVIRONMENT

(71) Applicant: INTERNATIONAL BUSINESS MACHINES CORPORATION, Armonk, NY (US)

(72) Inventors: Hui Chen, Xi'An (CN); Guang Ya Liu, Xian (CN); Xu Zhao, Xi'an (CN); Qing Hao, Xi'an (CN); Long Long Cao, Xi'an (CN); Shi Chuang Ren, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/303,350

(22) Filed: May 27, 2021

(51) Int. Cl.
*G06F 16/23* (2019.01)
*G06F 9/54* (2006.01)
(Continued)

(52) U.S. Cl.
CPC ............... *H04L 67/16* (2013.01); *G06F 8/60* (2013.01); *H04L 67/10* (2013.01)

(58) Field of Classification Search
CPC ............ H04L 67/16; H04L 67/10; G06F 8/60
(Continued)

(56) References Cited

U.S. PATENT DOCUMENTS 8,631,410 B2  1/2014  Fu
9,648,084 B2 *  5/2017  Bihani ................... G06F 9/505
(Continued)

FOREIGN PATENT DOCUMENTS

CN  105677342 A  *  6/2016  ............ G06F 9/452
CN  107046567 A  *  8/2017
(Continued)

OTHER PUBLICATIONS

Disclosed Anonymously, "Automatic Workload Partitioning for On-Demand Provisioning in a Cloud Environment," IP.com Prior Art Database Technical Disclosure, IP.com No. IPCOM000256141D, Nov. 7, 2018, pp. 1-8.
(Continued)

*Primary Examiner* — David R Lazaro
*Assistant Examiner* — Berhanu Shitayewoldetadik
(74) *Attorney, Agent, or Firm* — David Spalding

(57) ABSTRACT

Embodiments of the present disclosure relate to application deployment in a multi-cluster environment. In an embodiment, a computer-implemented method is disclosed. According to the method, first information about a resource requirement of an application is sent to a plurality of managed computing clusters. A plurality of predicted deployment results are received from the plurality of managed computing clusters, which indicate whether the application is to be partially or fully and successfully deployed on the plurality of managed computing clusters. In accordance with a determination, from the plurality of predicted deployment results, that a plurality of functions of the application fail to be deployed on a single managed computing cluster, at least two managed computing clusters are selected from the plurality of managed computing clusters and the application is deployed on the at least two managed computing clusters. In other embodiments, a system and a computer program product are disclosed.

20 Claims, 13 Drawing Sheets

(51) Int. Cl.
*H04L 29/08* (2006.01)
*G06F 16/955* (2019.01)
*H04L 15/16* (2006.01)
*H04L 12/24* (2006.01)
*H04L 12/721* (2013.01)
*H04L 9/32* (2006.01)
*H04L 67/51* (2022.01)
*H04L 67/10* (2022.01)
*G06F 8/60* (2018.01)

(58) Field of Classification Search
USPC .......................................................... 709/223
See application file for complete search history.

(56) References Cited

U.S. PATENT DOCUMENTS

| | | | | |
|---|---|---|---|---|
| 9,843,624 | B1 * | 12/2017 | Taaghol | H04L 45/64 |
| 10,476,938 | B2 * | 11/2019 | Barnes | H04L 67/10 |
| 10,514,967 | B2 * | 12/2019 | McClory | H04L 41/5054 |
| 10,652,313 | B2 * | 5/2020 | Chen | H04L 67/10 |
| 10,698,735 | B2 | 6/2020 | Chen | |
| 10,841,152 | B1 * | 11/2020 | Humphreys | G06F 9/45558 |
| 11,194,566 | B1 * | 12/2021 | Gabrielson | G06F 11/3692 |
| 2003/0149685 | A1 * | 8/2003 | Trossman | G06F 11/3055 |
| 2005/0005018 | A1 * | 1/2005 | Datta | G06F 9/5016 |
| | | | | 709/208 |
| 2005/0267918 | A1 * | 12/2005 | Gatev | H04L 67/10 |
| | | | | 707/999.203 |
| 2007/0240162 | A1 * | 10/2007 | Coleman | G06F 11/008 |
| | | | | 718/104 |
| 2008/0082665 | A1 * | 4/2008 | Dague | G06F 8/63 |
| | | | | 709/226 |
| 2013/0024554 | A1 * | 1/2013 | Jian | H04L 41/0843 |
| | | | | 709/222 |
| 2015/0212840 | A1 * | 7/2015 | Biran | G06F 9/5077 |
| | | | | 718/1 |
| 2015/0378716 | A1 * | 12/2015 | Singh | H04L 67/10 |
| | | | | 717/172 |
| 2016/0057073 | A1 | 2/2016 | Steinder | |
| 2016/0087933 | A1 * | 3/2016 | Johnson | H04L 67/125 |
| | | | | 709/245 |
| 2016/0119202 | A1 | 4/2016 | Iyer | |
| 2017/0006135 | A1 * | 1/2017 | Siebel | H04L 67/12 |
| 2017/0302505 | A1 * | 10/2017 | Zafer | H04L 43/08 |
| 2018/0288129 | A1 * | 10/2018 | Joshi | H04L 41/5035 |
| 2018/0322437 | A1 * | 11/2018 | Mcclory | G06F 9/45558 |
| 2018/0324204 | A1 * | 11/2018 | McClory | G06F 11/3684 |
| 2019/0373031 | A1 * | 12/2019 | Patel | H04L 65/4069 |
| 2019/0394258 | A1 * | 12/2019 | Park | G06F 16/9024 |
| 2019/0394259 | A1 * | 12/2019 | Park | G06F 16/24568 |
| 2020/0067789 | A1 * | 2/2020 | Khuti | G06N 5/046 |
| 2020/0192651 | A1 * | 6/2020 | Mudumbai | G06F 8/65 |
| 2020/0192690 | A1 * | 6/2020 | Gupta | H04L 67/10 |
| 2020/0218579 | A1 * | 7/2020 | D M | G06F 16/24578 |
| 2020/0267210 | A1 * | 8/2020 | Chatt | H04L 47/828 |
| 2020/0301759 | A1 * | 9/2020 | Vaddi | G06F 8/65 |
| 2020/0319909 | A1 * | 10/2020 | Jawahar | G06F 9/455 |
| 2020/0348984 | A1 * | 11/2020 | Giannetti | G06F 8/60 |
| 2020/0394455 | A1 | 12/2020 | Lee | |
| 2020/0404076 | A1 * | 12/2020 | Mahadevan | G06F 9/5044 |
| 2021/0021676 | A1 * | 1/2021 | Reineke | H04L 67/10 |
| 2021/0144517 | A1 * | 5/2021 | Guim Bernat | G06F 9/4881 |
| 2022/0050938 | A1 * | 2/2022 | Mukherjee | H04L 67/10 |

FOREIGN PATENT DOCUMENTS

| | | | | |
|---|---|---|---|---|
| CN | 106027643 | B | | 10/2018 |
| CN | 109586983 | A | * | 4/2019 |
| CN | 109783717 | A | * | 5/2019 |
| CN | 106254150 | B | * | 6/2019 ......... H04L 41/0672 |
| CN | 110990348 | A | * | 4/2020 |
| CN | 111338754 | A | * | 6/2020 |
| CN | 111400430 | A | * | 7/2020 |
| CN | 111597045 | A | | 8/2020 |
| CN | 111970383 | A | * | 11/2020 |
| CN | 111984269 | A | * | 11/2020 .......... G06F 15/161 |
| CN | 111984270 | A | * | 11/2020 ............... G06F 8/60 |
| CN | 112732272 | A | * | 4/2021 |
| CN | 111262906 | B | * | 5/2021 ......... H04L 67/1012 |
| CN | 112925651 | A | * | 6/2021 |
| CN | 112988219 | A | * | 6/2021 |
| CN | 113132431 | A | * | 7/2021 |
| CN | 113238763 | A | * | 8/2021 |
| WO | WO-2005124553 | A1 | * | 12/2005 ......... H04L 12/2602 |
| WO | WO-2015161472 | A1 | * | 10/2015 ........... G06F 9/5083 |

OTHER PUBLICATIONS

Mell et al., "The NIST Definition of Cloud Computing", National Institute of Standards and Technology, Special Publication 800-145, Sep. 2011, 7 pages.

GitHub, "virtual-kubelet /tensile-kube," Accessed: May 27, 2021, Retrieved from the Internet: https://github.com/virtual-kubelet/tensile-kube, 7 pages.

* cited by examiner

APPLICATION DEPLOYMENT IN A MULTI-CLUSTER ENVIRONMENT

BACKGROUND

The present disclosure relates to computer techniques, and more specifically, to application deployment in a multi-cluster environment.

Cloud computing infrastructures are becoming increasingly popular due to their increased scale, agility, and elasticity arising from the ability to quickly provision and use precisely the requisite amount of compute resources on-demand (in the case of cloud computing infrastructures) to meet increased customer demands. Multi-cloud/hybrid-cloud computing environments, which are compositions of private clouds and/or public clouds, are becoming increasingly popular. In such computing environments, an application may be deployed on multiple computing clusters formed from different cloud computing environments.

SUMMARY

According to one embodiment of the present disclosure, there is provided a computer-implemented method. According to the method, first information about a resource requirement of an application is sent to a plurality of managed computing clusters. A plurality of predicted deployment results are received from the plurality of managed computing clusters, which indicate whether the application is to be partially or fully and successfully deployed on the plurality of managed computing clusters. In accordance with a determination, from the plurality of predicted deployment results, that a plurality of functions of the application fail to be deployed on a single one of the plurality of managed computing clusters, at least two managed computing clusters are selected from the plurality of managed computing clusters and the application is deployed on the at least two managed computing clusters.

According to a further embodiment of the present disclosure, there is provided a system. The system comprises a processing unit; and a memory coupled to the processing unit and storing instructions thereon. The instructions, when executed by the processing unit, perform acts of the method according to the embodiment of the present disclosure.

According to a yet further embodiment of the present disclosure, there is provided a computer program product being tangibly stored on a non-transient machine-readable medium and comprising machine-executable instructions. The instructions, when executed on a device, cause the device to perform acts of the method according to the embodiment of the present disclosure.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
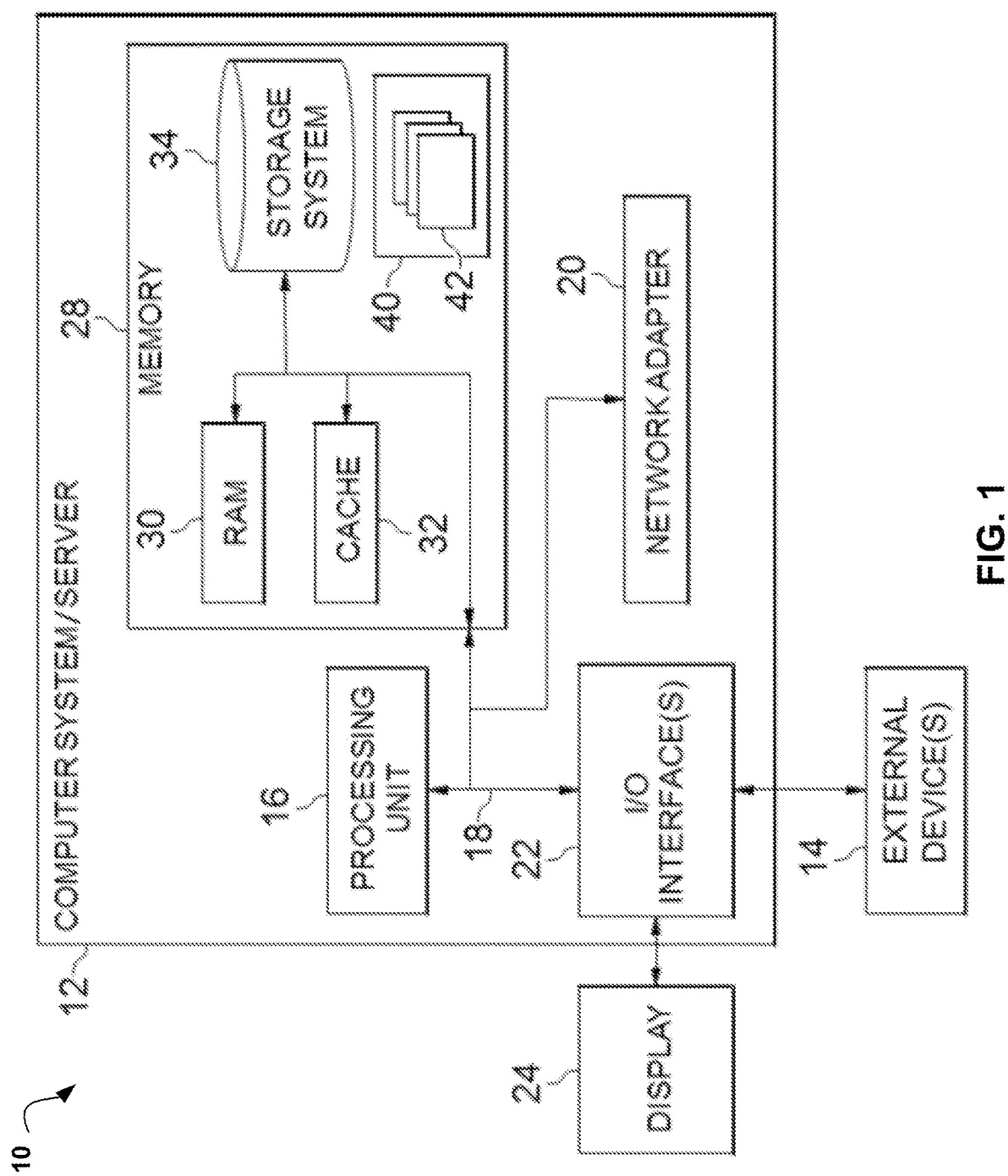
FIG. 1 depicts a cloud computing node in accordance with some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
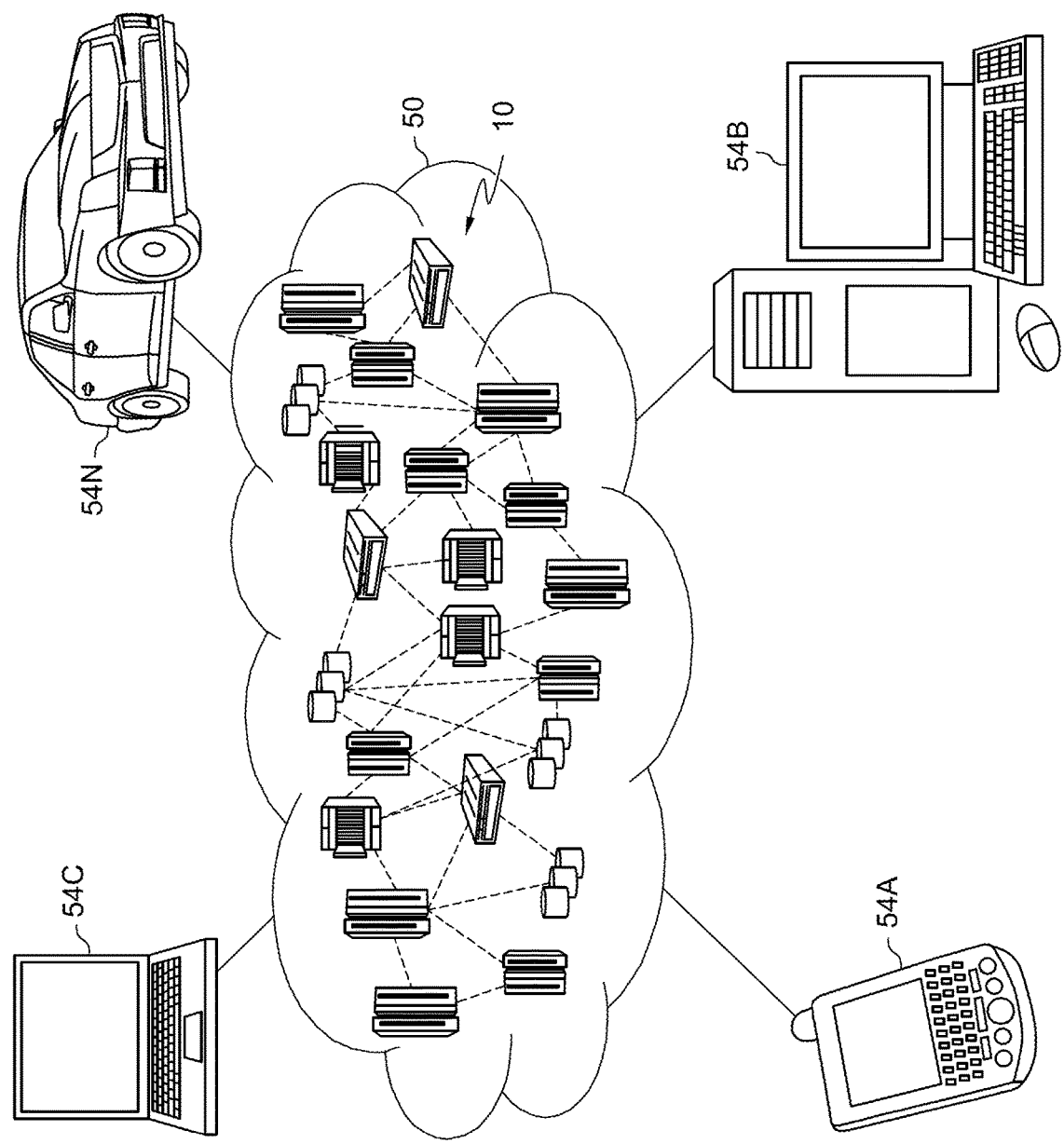
FIG. 2 depicts a cloud computing environment in accordance with some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
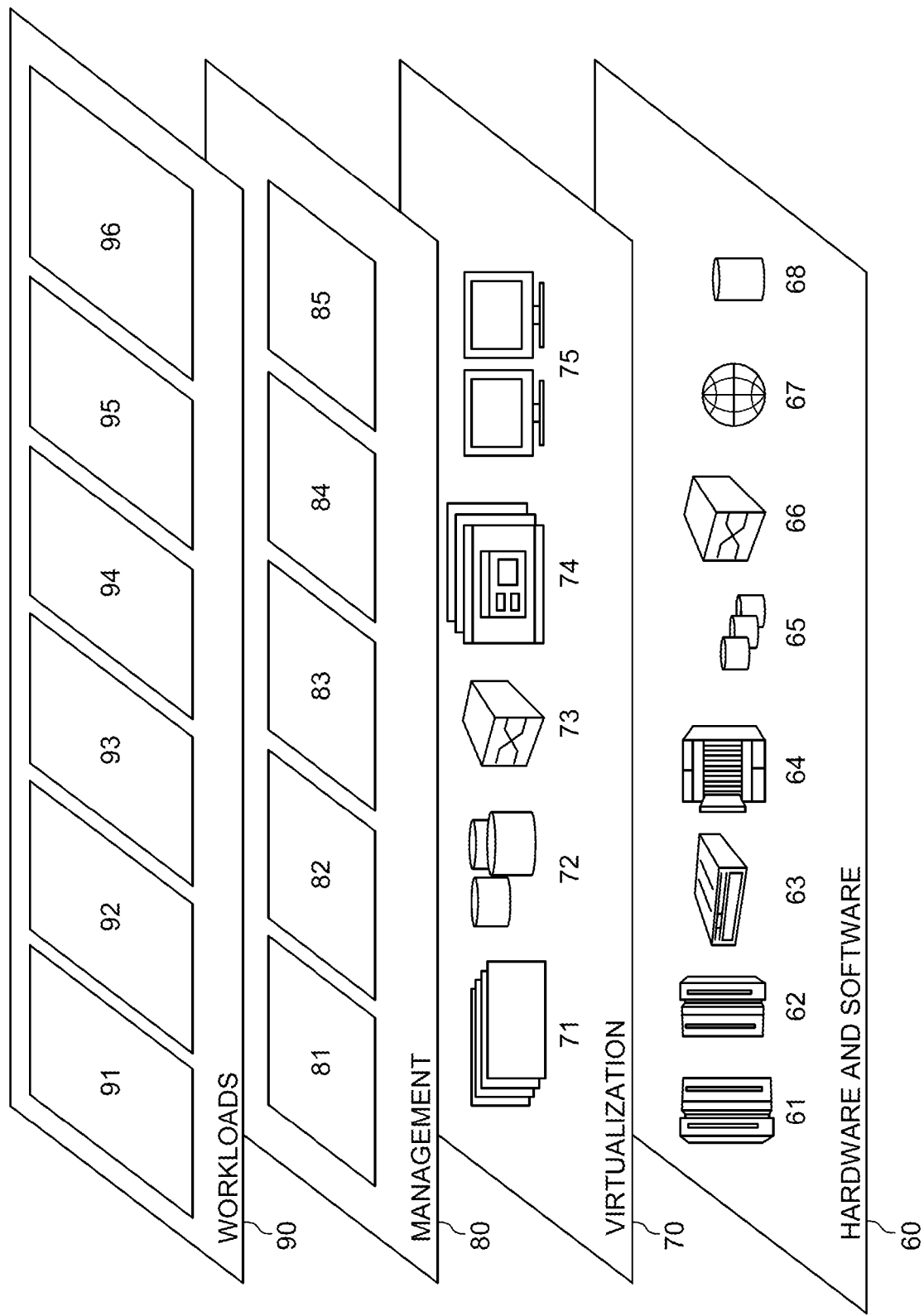
FIG. 3 depicts abstraction model layers in accordance with some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application deployment 96. The functionalities of application deployment 96 will be described in the following embodiment of the present disclosure.

As used herein, an "application" can be a general term that can refer to any application or service capable of being executed in or otherwise provisioned in a computing environment to support corresponding tasks or functions. For example, an application can be any type of software application, web service, identity management service, firewall or other security service, messaging service, data storage or backup service, file maintenance service, status monitoring, or any other service that can be made available to consumers of the computing environment. It should be appreciated that other services associated with or otherwise supported by a computing environment are envisioned.

Figure 4A:
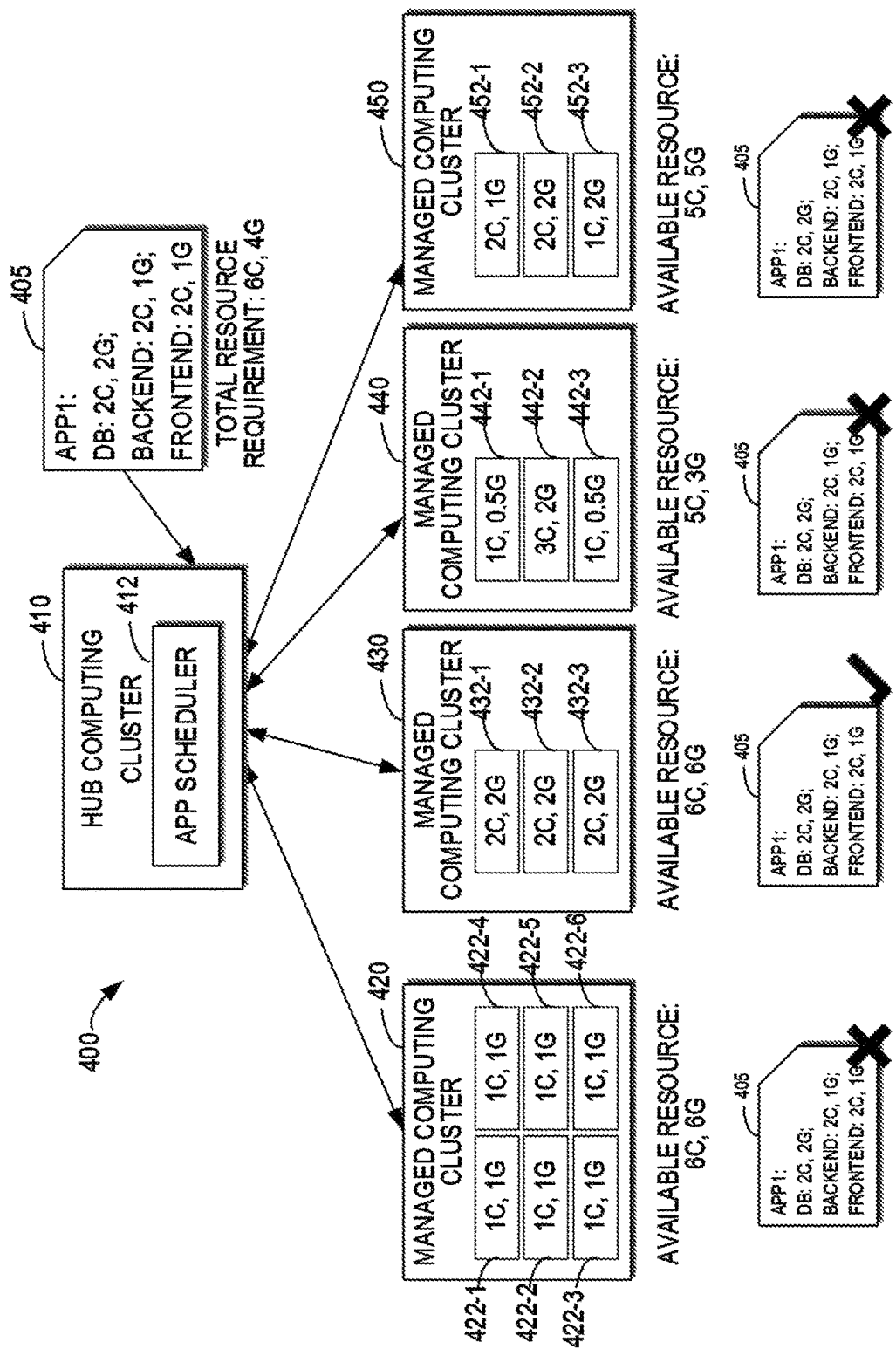
FIG. 4A depicts a block diagram of an example multi-cluster computing environment for deployment of an application.

FIG. 4A depicts a block diagram of an example multi-cluster computing environment 400 for deployment of an application (APP). As shown, the computing environment 400 includes a hub computing cluster 410 and a plurality of managed computing clusters, such as managed computing clusters 420, 430, 440, and 450.

Each of the managed computing clusters 420, 430, 440, and 450 includes a number of nodes, for example, the managed computing cluster 420 has six nodes 422-1 to 422-6. A node may be described as a server, computer, computing node, or virtual machine. The nodes in the managed computing clusters 420, 430, 440, and 450 provide resources required for running applications deployed thereon. Examples of such resources may include, but are not limited to, processing resources, memory resources, storage resources, networking bandwidth, and/or other resources needed in application deployment.

The hub computing cluster 410 is configured to manage the plurality of managed computing clusters 420, 430, 440, and 450, to monitor resources of the plurality of managed computing clusters 420, 430, 440, and 450, and to deploy one or more applications on the plurality of managed computing clusters 420, 430, 440, and 450. The plurality of managed computing clusters 420, 430, 440, and 450 are configured to run workloads of the deployed applications. As illustrated, the hub computing cluster 410 includes an application scheduler 412 to schedule deployment of an application among the plurality of managed computing clusters 420, 430, 440, and 450. An owner of the application may be able to complete the application deployment via an endpoint of the hub computing cluster. In some embodiments, an application may be deployed as replicas applications on different managed computing cluster for high availability requirement.

Each of the managed computing clusters in the computing environment 400 may include a cloud or a cloud computing environment or a part thereof, such as the cloud computing environment 50 of FIG. 2, which may be provided by a same or different cloud provider. Thus, the computing environment 400 may also be referred to as a multi-cloud or hybrid-cloud computing environment. In some cases, the managed computing clusters in the computing environment 400 may be owned by different cloud providers. In the multi-cloud or hybrid-cloud, different managed computing clusters may not need to have network access therebetween.

Generally, the hub computing cluster may deploy an application on one of the managed computing clusters based on a deployment policy. However, after the hub computing cluster has issued the deployment decision to a selected managed computing cluster, it is possible that the managed computing cluster may not have sufficient available resources to meet a resource requirement of the application and thus may not be able to run the application.

FIG. 4A illustrates an example application deployment where an application 405 ("APP1") is to be deployed by the hub computing cluster 410. The application 405 includes a plurality of functions, each having its resource requirement. In this example, the application 405 includes a database (DB) function requiring two processing cores ("2C," where "C" stands for "core") and 2 GB of memory resources ("2G"), a frontend function requiring 2C and 1G, and a backend function requiring 2C and 1G. The total resource requirement of the application 405 is 6C and 4G.

FIG. 4A also illustrates available resources in nodes of the managed computing clusters 420, 430, 440, and 450. As illustrated, the managed computing cluster 420 has six nodes 422-1 to 422-6, each having available resources of one core ("1C") and 1 GB of memory ("1G"). The managed computing cluster 430 has three nodes 432-1 to 432-3, each having available resources of 2C and 2G. The managed computing cluster 440 has three nodes 442-1 to 442-3 with available resources of (1C, 0.5G), (3C, 2G), and (1C, 0.5G) respectively. The managed computing cluster 450 has three nodes 452-1 to 452-3 with available resources of (2C, 1G), (2C, 2G), and (1C, 2G) respectively.

In the example of FIG. 4A, the application 405 can be successfully deployed and run on the managed computing cluster 430 because the available resources of the nodes of the managed computing cluster 430 can meet the resource requirements of the functions of the application 405. Although the total amount of available resources of the managed computing cluster 420 is 6C and 6G, the application 405 cannot be successfully deployed on the managed computing cluster 420 because according to the application configuration and/or the deployment requirement, one function of an application may need to be deployed on a single node of a managed computing cluster. As seen, the available resources of the nodes 422-1 to 422-6 of the managed computing cluster 420 cannot meet the resource requirements of each of the three functions of the application 405. For similar reasons, the application 405 cannot be successfully deployed on the managed computing cluster 440 or 450 because the available resources of the nodes of the two clusters cannot meet the resource requirements of one or two of the three functions of the application 405.

Figure 4B:
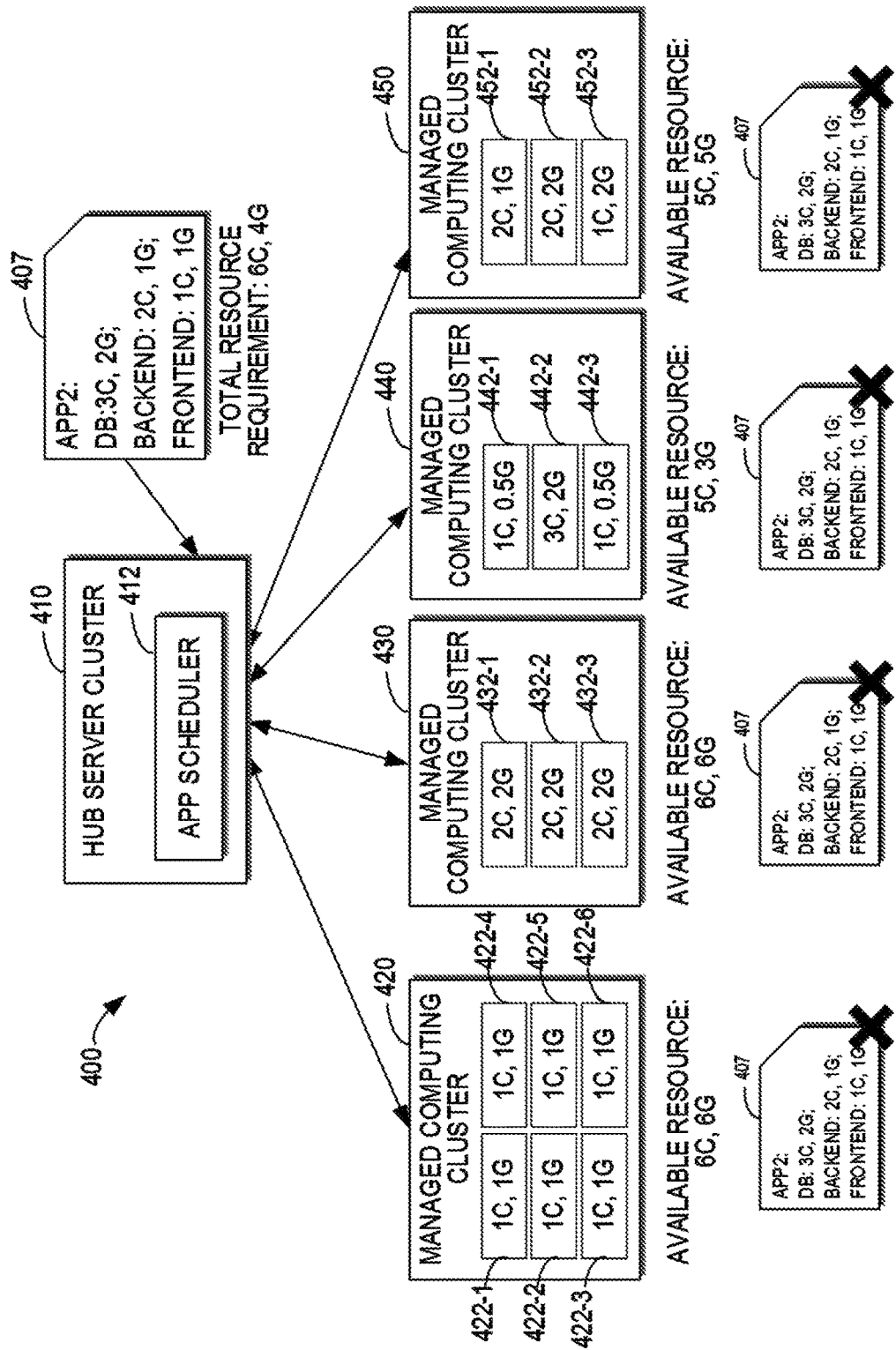
FIG. 4B depicts a block diagram of an example multi-cluster computing environment for deployment of another application.

In some cases, none of the managed computing clusters 420, 430, 440, and 450 can have an application successfully deployed thereon even if those managed computing clusters 420, 430, 440, and 450 all have some available resources. FIG. 4B illustrates another example of application deployment. In this example, an application 407 ("APP2") is to be deployed by the hub computing cluster 410. The DB function requires 3C and 2G, a frontend function requiring 2C and 1G, and a backend function requiring 1C and 1G. The total resource requirement of the application 407 is 6C and 4G which is the same as that of the application 405. With the available resources of the nodes of the managed computing clusters 420, 430, 440, and 450 unchanged, the application 407 cannot be successfully deployed on any of the managed computing clusters because no available resources of the nodes in any managed computing cluster can meet the resource requirements of all the three functions of the application 405.

It would be appreciated that the examples of FIGS. 4A and 4B are merely provided for purpose of illustration. The number of clusters, the number of nodes in each cluster, the illustrated resource types, the resource requirements, and the functions of the applications in FIGS. 4A and 4B are merely illustrated as specific examples, without suggesting any limitation to the scope of the present disclosure.

In conventional computing environments, the hub computing cluster may have only general information about resource availability of a whole managed computing cluster but does not have specific information about respective available resources of the nodes of the managed computing cluster. The hub computing cluster may select a managed computing cluster based on its deployment policy and the general information about the resource availability. As mentioned above, sometimes the selected managed computing cluster may not have sufficient available resources to run the application. To solve this issue, there are some solutions proposed.

According to a traditional solution, the application may be placed to a pending status because the managed computing cluster cannot successfully deploy it. Technical expertise may need to be involved to select another managed computing cluster to re-deploy the application if the other managed computing cluster has sufficient resources.

However, the manual checking by the technical expertise is required and this solution works only when there is another managed computing cluster on which the application can be successfully deployed. In the example of FIG. 4A, if the hub computing cluster 410 selects the managed computing cluster 420 first to deploy the application 405 but the application deployment is in a pending status, technical expertise should manually re-deploy the application 405 to the managed computing cluster 430. In the example of FIG. 4B, no managed computing cluster can be found to have the application 407 successfully deployed thereon.

As another option, the nodes of the currently selected managed computing cluster may be scaled up to provide more available resources for deploying the application. In this option, the existing resources in the computing environment are not fully utilized, which results in low resource utilization and increased costs. Alternatively, a new managed computing cluster may be created, or new nodes may be added, which may cause cloud burst and also have low resource utilization and increased costs. Depending on application priorities, sometimes it may be able to trigger a reclaim policy to un-deploy one or more applications that are running in the currently selected managed computing cluster and have low priorities. However, the reclaiming may have impact on the currently running application(s) which may be undesirable in some scenarios.

In accordance with embodiments of the present disclosure, there is provided a solution for application deployment in a multi-cluster computing environment. In this solution, by sending information about a resource requirement of an application on a plurality of managed computing clusters, predicted deployment results with respect to the application are obtained from the plurality of managed computing clusters. The hub computing cluster may select one or more of the managed computing clusters based on the predicted deployment results and deploy the application on the at least one selected managed computing cluster(s). Specifically, it is determined from the predicted deployment results that not a single managed computing cluster can have a plurality of functions of the application successfully deployed, the hub computing cluster selects two or more managed computing clusters to deploy the application.

Through this solution, it is possible to achieve maximum resource utilization in existing managed computing resources and to avoid resource waste by splitting the application to deploy on two or more managed computing clusters. Cloud burst and extra node creation can be avoided to save costs. In addition, it is possible to make sure the quality of service (QoS) when the application with high priority is needed to deploy on the computing cluster.

Some example embodiments of the present disclosure will be described in detail with reference to the accompanying figures.

Figure 5:
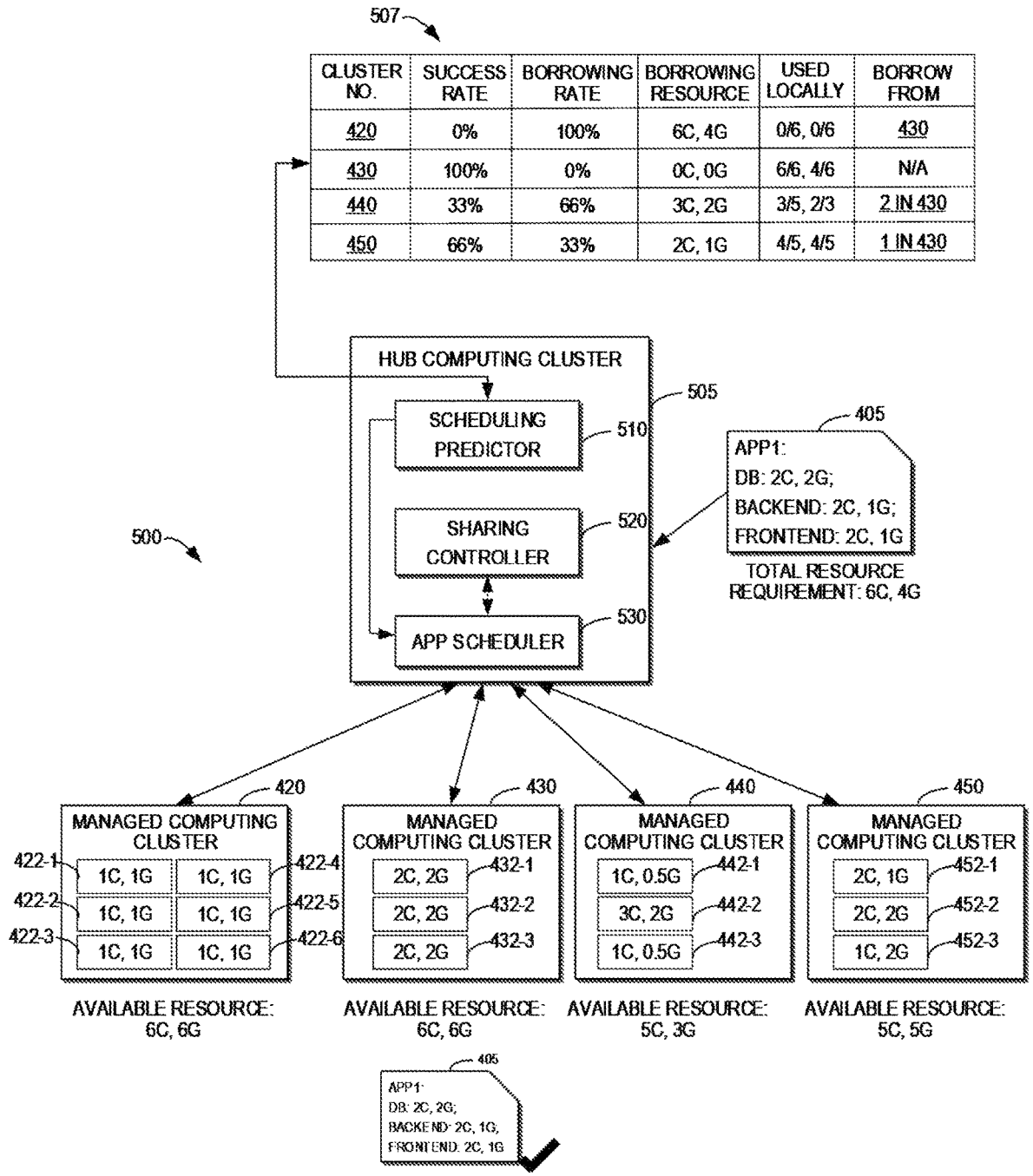
FIG. 5 depicts a block diagram of an example multi-cluster computing environment for deployment of an application in accordance with some embodiments of the present disclosure.

Reference is made to FIG. 5, which depicts a block diagram of an example multi-cluster computing environment 500 for deployment of an application in accordance with some embodiments of the present disclosure. According to the embodiments of the present disclosure, a hub computing cluster 505 includes a scheduling predictor 510, a sharing controller 520, and an application scheduler 530.

The scheduling predictor 510 is configured to predict deployment of an application on the managed computing clusters 420, 430, 440, and 450 and receive predicted deployment results of the application from the managed computing clusters 420, 430, 440. A predicted deployment result received from a managed computing cluster indicates whether the application is to be partially or fully and successfully deployed on the managed computing cluster. In some embodiments, the scheduling predictor 510 may generate a capability summary (such as a capability table, a capability XML description, etc., and a capability table is used as an example in the following description) based on the predicted deployment results received from the managed computing clusters 420, 430, 440, and 450. In the example illustrated in FIG. 5, a capability table 507 determined for the application 405 is illustrated.

The application scheduler 530 is configured to select one or more managed computing clusters to deploy the application based on the predicted deployment results and to deploy the application on the selected managed computing cluster(s). The sharing controller 520 may be configured to implement resource sharing among managed computing clusters in the case that two or more managed computing cluster are selected to deploy the application. As such, it is possible to split an application to deploy on two or more managed computing clusters.

In some embodiments, the scheduling predictor 510, the sharing controller 520, and the application scheduler 530 may be provisioned as services or functional modules in the hub computing cluster 505. Although illustrated as located within the hub computing cluster 505, the scheduling predictor 510, the sharing controller 520, and the application scheduler 530 may be provisioned outside the hub computing cluster 505.

Figure 6:
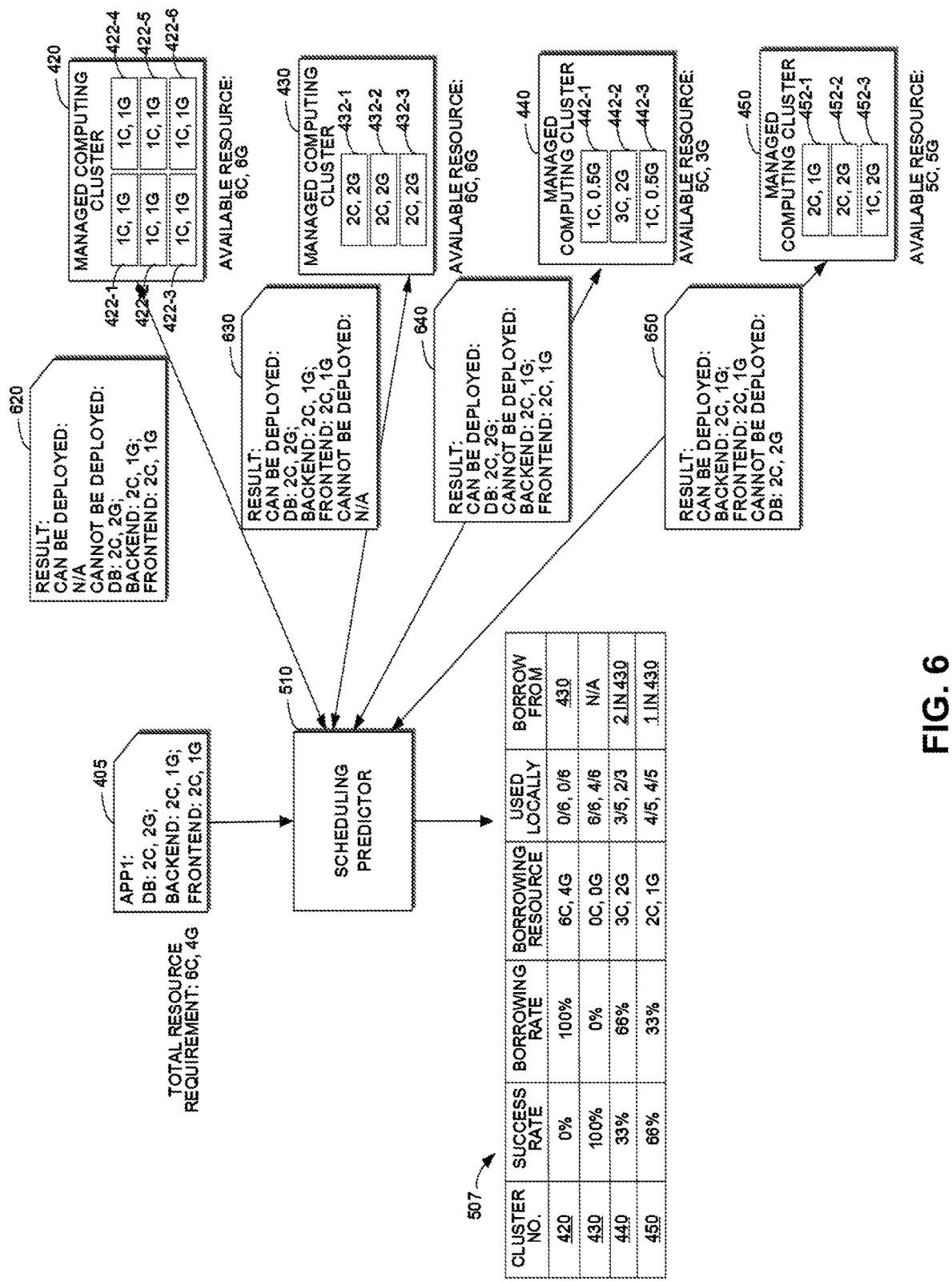
FIG. 6 depicts a block diagram of example interactions between a scheduling predictor with managed computing clusters of FIG. 5 in accordance with some embodiments of the present disclosure.

Reference is made to FIG. 6 to illustrate example interactions between the scheduling predictor 510 with the managed computing clusters, to determine the predicted deployment results for the application 405. The scheduling predictor 510 may be aware of a resource requirement of the application 405. For example, the resource requirement of the application 405 is six processing cores (6C) and 4 GB of memory (4G). It would be appreciated that although two resource types (processing resources and memory resources) are illustrated and discussed herein, an application may require one or more other resource types such as the storage resources, the networking bandwidth and the like.

In some embodiments, an application may include a plurality of functions, each having its resource requirement. For example, the application 405 may include a DB function, a frontend function, and a backend function which have their own resource requirements as illustrated. However, it would be appreciated that the illustrated resource requirement is just an example, and different applications may have different functions and different resource requirements. Depending on the application configuration, the functions of the application may be configured in different granularities. For example, the DB function of the application 405 may be further divided into a plurality of sub-functions.

To predict whether the application 405 can be partially or fully and successfully deployed on the managed computing clusters 420, 430, 440, and 450, the scheduling predictor 510 sends information about the resource requirement of the application 405 to those managed computing clusters 420, 430, 440, and 450. In the embodiment where different functions of the application 405 have their own resource requirements, the scheduling predictor 510 may send information about respective resource requirements of the functions of the application 405 to the managed computing clusters 420, 430, 440, and 450.

In some embodiments, in addition to the information about the resource requirement, the scheduling predictor 510 may send other information about a specification of the application 405 which is needed by the managed computing clusters to determine whether the application 405 (and its functions) can be successfully deployed or not.

Upon reception of the information from the scheduling predictor 510, the managed computing clusters 420, 430, 440, and 450 may determine whether the application 405 can be deployed thereon based on the received information. In particular, a managed computing cluster may determine whether the available resources of its nodes can satisfy the resource requirement of the application 405, or the respective resource requirements of the plurality of functions of the application 405. The managed computing clusters 420, 430, 440, and 450 may then send predicted deployment results 620, 630, 640, and 650, respectively, to indicate whether the application 405 can be partially or successfully deployed on the corresponding managed computing clusters.

In some embodiments, depending on the application configuration and/or the deployment requirement, one function of an application may need to be deployed on a single node of a managed computing cluster. Thus, a resource requirement of a function of the application may be satisfied by a single node of a managed computing cluster. In such a case, to successfully deploy an application on a managed computing cluster, nodes of the managed computing cluster may have sufficient available resources to satisfy the resource requirement of at least one of the functions of the application. If a managed computing cluster can satisfy the resource requirement(s) of one or some but not all of the functions of the application, the application may be considered to be partially successfully deployed on the managed computing cluster. If a managed computing cluster have available resources on the nodes to satisfy respective resource requirements of the plurality of functions, the application may be considered to be fully and successfully deployed on this managed computing cluster.

In some embodiments, it may be allowable to utilize two or more nodes of a managed computing cluster to satisfy a resource requirement of one function of the application. It would be appreciated that whether an application can be fully or partially successfully deployed on a managed computing cluster may depend on the local deployment requirement of the managed computing cluster.

In some embodiments, a predicted deployment results from a managed computing cluster may specifically indicate whether the functions of the application can be successfully deployed and/or whether the functions fail to be deployed on the managed computing cluster. In the illustrated example of FIG. 6, the predicted deployment result 620 from the managed computing cluster 420 indicates that none of the functions of the application 405 can be deployed on the managed computing cluster 420 because the available resource of any of the nodes 422-1 to 422-6 of this cluster cannot satisfy the resource requirement of any of the functions. The predicted deployment result 620 may alternatively or additionally indicate that the three functions of the application 405 fail to be deployed on this cluster.

The predicted deployment result 630 from the managed computing cluster 430 indicates that all the functions of the application 405 can be deployed on the managed computing cluster 430 because the available resource of the three nodes 432-1 to 432-3 of this cluster can satisfy the resource requirement of the three functions respectively. The predicted deployment result 630 may alternatively or additionally indicate that none of the functions of the application 405 fails to be deployed on this cluster.

The predicted deployment result 640 from the managed computing cluster 440 indicates that the DB function of the application 405 can be deployed on the managed computing cluster 440 because the available resource of the node 442-2 of this cluster can satisfy the resource requirement of the DB function. The predicted deployment result 640 may alternatively or additionally indicate that the frontend and backend functions of the application 405 fail to be deployed on this cluster. It is noted that it is the managed computing cluster 440's decision to determine which functions of the application 405 can be successfully deployed using the available resources of the nodes.

The predicted deployment result 650 from the managed computing cluster 450 indicates that the frontend and backend functions of the application 405 can be deployed on the managed computing cluster 450 because the available resources of the nodes 542-1 and 452-2 of this cluster can satisfy the resource requirements of the two functions respectively. The predicted deployment result 650 may alternatively or additionally indicate that the DB function of the application 405 fails to be deployed on this cluster.

In some embodiments, after receiving the predicted deployment results 620, 630, 640, and 650 from the managed computing clusters 420, 430, 440, and 450 respectively, the scheduling predictor 510 may analyze those predicted deployment results to generate the capability table 507 which indicates respective factors related to the capabilities of the managed computing clusters 420, 430, 440, and 450 in term of deploying the application 405.

Specifically, the scheduling predictor 510 may determine a success rate of deploying the application 405 on each managed computing cluster from the predicted deployment result. In some examples, the success rate may be determined based on the number of functions of the application 405 that can be successfully deployed on the managed computing cluster as indicated by the predicted deployment result, for example, by determining a ratio of the number of successfully deployed functions and the total number of functions. The success rates of the managed computing clusters 420, 430, 440, and 450 are listed in the "success rate" column of the capability table 507. As illustrated, the success rate of the managed computing cluster 420 may be 0% because none of the functions can be successfully deployed on this cluster; the success rate of the managed computing cluster 430 may be 100% because all of the functions can be successfully deployed on this cluster; and the success rates of other managed computing clusters can be determined similarly.

In addition to the success rate or as an alternative, for a managed computing cluster, the scheduling predictor 510 may determine, from the predicted deployment result, a borrowing rate of resources to be borrowed from at least one other managed computing cluster for fully deploying the application 405. The borrowing rate may be determined based on the success rate of the managed computing cluster, for example, by subtracting the success rate from 100%. The borrowing rate may indicate how much resources may be borrowed from other managed computing resource(s) if the application 405 is fully deployed. For example, for the managed computing cluster 420, as none of the functions of the application can be deployed on this cluster, the borrowing rate is 100% which indicates that all the resources required for deploying the application 405 need to be borrowed from other managed computing clusters. The borrowing rates of the managed computing clusters 420, 430, 440, and 450 are listed in the "borrowing rate" column of the capability table 507.

In some embodiments, as an alternative or in addition, for a managed computing cluster, the scheduling predictor 510 may determine, from the predicted deployment result, a resource amount to be borrowed from one or more other managed computing clusters. In the example of FIGS. 5 and 6, for the managed computing cluster 420, all the resources required by the application 405 need to be borrowed from other managed computing clusters. Thus, the resource amount to be borrowed from other managed computing clusters is 6C and 4G. For the managed computing cluster 440, the DB function can be deployed on this cluster and the resources required for deploying the frontend and backend functions need to be borrowed from other managed computing clusters. Thus, the resource amount to be borrowed is the total resource amount required for deploying the frontend and backend functions, i.e., 3C and 2G. The resource amounts to be borrowed of the managed computing clusters 420, 430, 440, and 450 are respectively listed in the "borrowed resource" column of the capability table 507.

In some embodiments, as an alternative or in addition, for a managed computing cluster, the scheduling predictor 510 may determine, from the predicted deployment result, available resource usage of deploying the application 405 on this managed computing cluster. The managed computing clusters 420, 430, 440, and 450 may report their total amount of available resources to the hub computing cluster 505. As an alternative, the hub computing cluster 505 may request those managed computing clusters to send their total amount of available resources. For a managed computing cluster, the scheduling predictor 510 may determine a total resource amount of the successfully deployed function(s), and then determine the available resource usage of successfully deployed function(s). For example, for the managed computing cluster 440, the total resource amount of the successfully deployed DB function is 3C and 2G. Since the total amount of available resources of this cluster is 5C and 3G, the scheduling predictor 510 may determine that the available resource usage is ⅗ for the processing resources and ⅔ for the memory resources. The available resource usage of the managed computing clusters 420, 430, 440, and 450 are respectively listed in the "used locally" column of the capability table 507.

In some embodiments, if the predicted deployment result of a certain managed computing cluster indicates that the application 405 cannot be fully and successfully deployed on this cluster, the scheduling predictor 510 may alternatively or additionally determine one or more other managed computing clusters from which resources are to be borrowed for fully deploying this application 405 together with the certain managed computing cluster. For example, for the managed computing cluster 420, the scheduling predictor 510 may determine that resources can be borrowed from the managed computing cluster 430. For the managed computing cluster 440, the scheduling predictor 510 may determine that resources can be borrowed from the managed computing cluster 430 to deploy two functions (the frontend and backend functions) of the application 405. For the managed computing cluster 450, the scheduling predictor 510 may determine that resources can be borrowed from the managed computing cluster 430 to deploy one function (the DB function) of the application 405. The other managed computing clusters from which resources are to be borrowed for each managed computing cluster are respectively listed in the "borrow from" column of the capability table 507.

In some embodiments, for a managed computing cluster on which the application 405 cannot be fully and successfully deployed, the scheduling predictor 510 may send information about one or more functions of the application 405 that fail to be deployed on this cluster to other computing clusters and receive further predicted deployment results from the other computing clusters to determine whether the one or more functions can be deployed thereon. If a predicted deployment result from a managed computing cluster indicates that the one or more functions of the application 405 can be deployed thereon, the scheduling predictor 510 may determine that resources of this cluster can be borrowed for fully deploying the application 405.

In some embodiments, if the scheduling predictor 510 determines, from the predicted deployment results 620, 630, 640, and 650, that the application 405 can be fully and successfully deployed on a single managed computing cluster (for example, the managed computing cluster 430 which has a success rate of 100%), then the scheduling predictor 510 may not need to determine the other managed computing clusters from which resources are to be borrowed for each managed computing cluster. In such a case, the "borrow from" column may be omitted from the capability table 507.

The scheduling predictor 510 may provide the capability table 507 for the application scheduler 530. The application scheduler 530 may select one or more of the managed computing clusters 420, 430, 440, and 450 to deploy the application 405 based on the capability table 507. In some embodiments, the application scheduler 530 may utilize a predetermined deployment policy to select the managed computing cluster(s) for the application deployment. As an example, the managed computing cluster with a higher success rate or 100% of success rate (for example, the managed computing cluster 430) may be selected with a higher probability. If the managed computing cluster 430 with a success rate of 100% is selected, the application scheduler 530 may send an application deployment request to the managed computing cluster 430 to deploy the application 405. Due to the previous prediction process, there is a high probability that the application 405 can be successfully deployed on the managed computing cluster 430 as illustrated in FIG. 5.

By selecting the managed computing cluster for application deployment based on a predicted application deployment process, the probability of successfully and timely deploying an application can be increased, without requiring manual involvement and cluster/node expansion to increase the available resources. The resources of the existing managed computing clusters can be effectively utilized.

In some embodiments, depending on the deployment policy configured on the hub computing cluster 505 or specifically configured for the application 405, the application scheduler 530 may select the managed computing cluster(s) based on one or more additional or alternative factors other than the success rate. For example, in some cases, the available resource usage of the managed computing clusters may additionally or alternatively be taken into account in order to make the best use of available resources of a managed computing cluster or allow the managed computing cluster has as many available resources left as possible after the application 405 is deployed on this cluster. In some examples, the resource amounts to be borrowed from other managed computing clusters may be additionally or alternatively be taken into account in order to make sure that a smaller or smallest amount of resources are needed to be borrowed from other managed computing clusters. It would be appreciated that other deployment policies may be additionally or alternatively utilized to select the managed computing cluster(s) for the application deployment.

In some embodiments, depending on a resource requirement of an application, there may not be a single managed computing cluster that can have the application fully and successfully deployed thereon. In such cases, the hub computing cluster of the present disclosure may be able to split the application to deploy on two or more managed computing clusters. FIGS. 7, 8A-8B, and 9 illustrate such embodiment.

Figure 7:
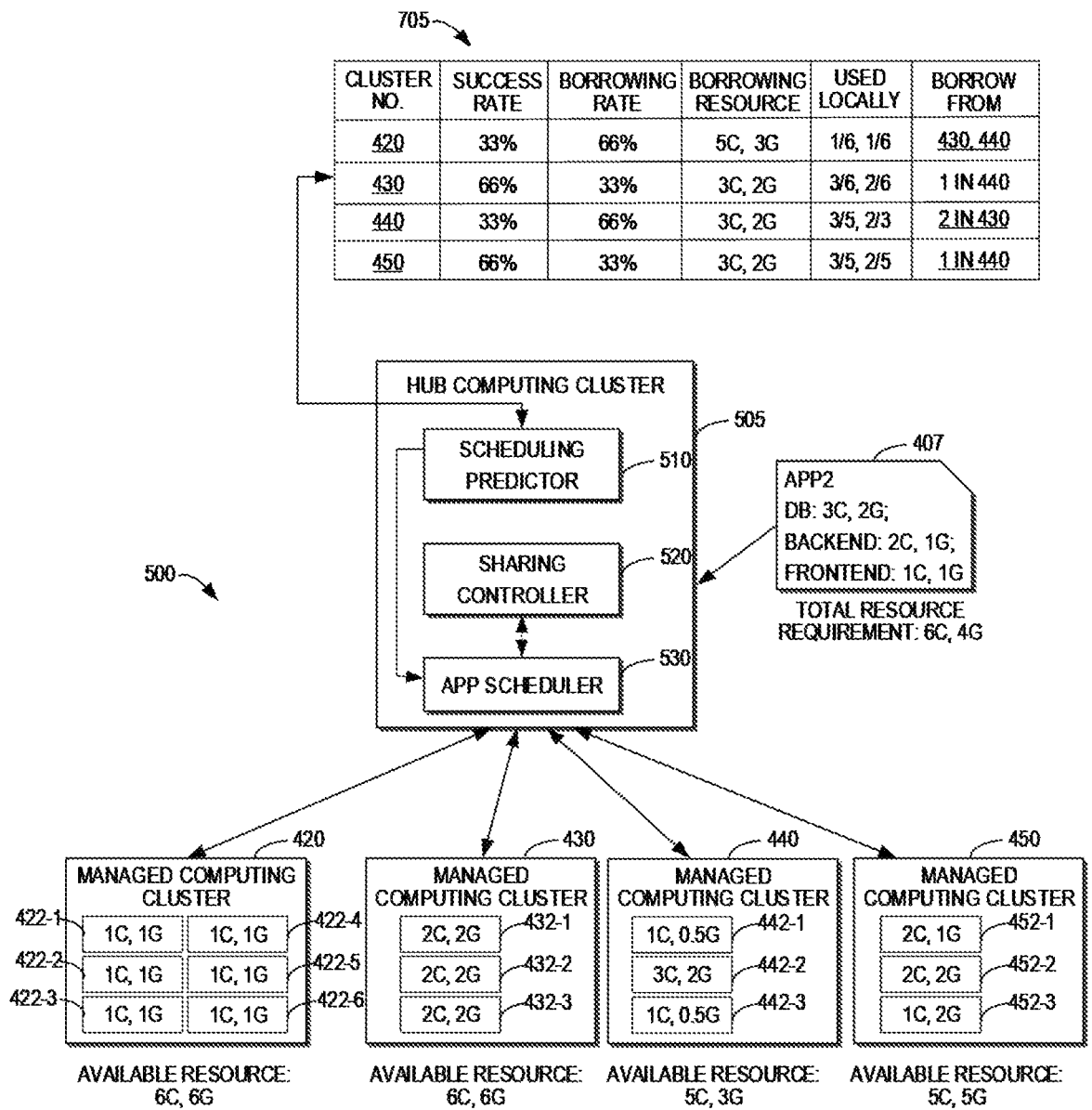
FIG. 7 depicts a block diagram of an example multi-cluster computing environment for deployment of another application in accordance with some other embodiments of the present disclosure.

FIG. 7 depicts a block diagram of an example multi-cluster computing environment 500 for deployment of another application (e.g., the application 407 as illustrated in FIG. 4B) in accordance with some other embodiments of the present disclosure. As the functions of the application 407 have different resource requirements than the application 405, the predicted deployment results on the managed computing clusters 420, 430, 440, and 450 may also be different which may in turn affect the actual application deployment. As illustrated, the scheduling predictor 510 may determine a capability table 705 for the application 407 by sending information about the resource requirement of the application 407 (such as information about the respective resource requirements of the functions of the application 407).

Figure 8A:
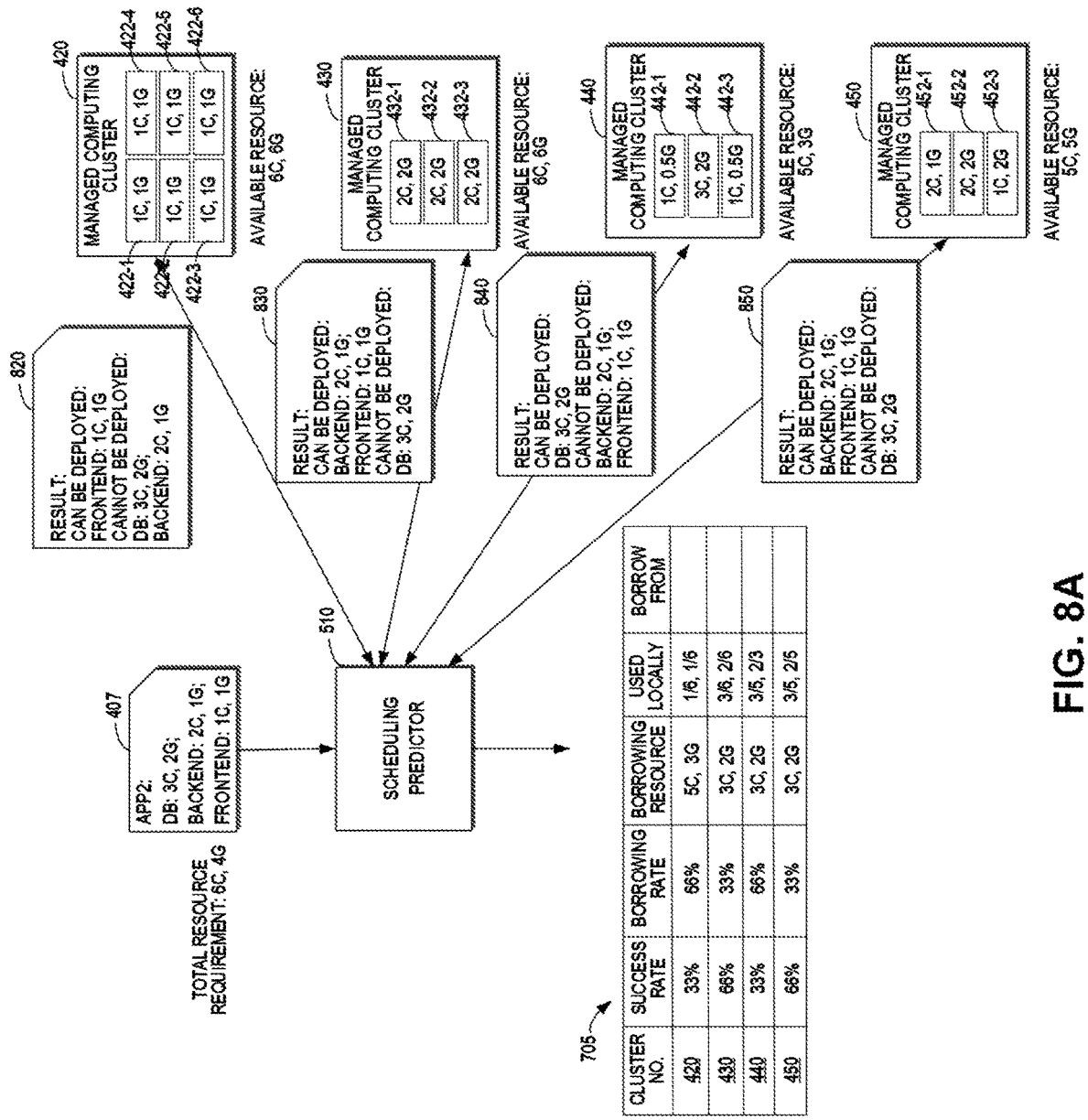
FIGS. 8A and 8B depict block diagrams of example interactions between a scheduling predictor with managed computing clusters of FIG. 7 in accordance with some embodiments of the present disclosure.
Figure 8B:
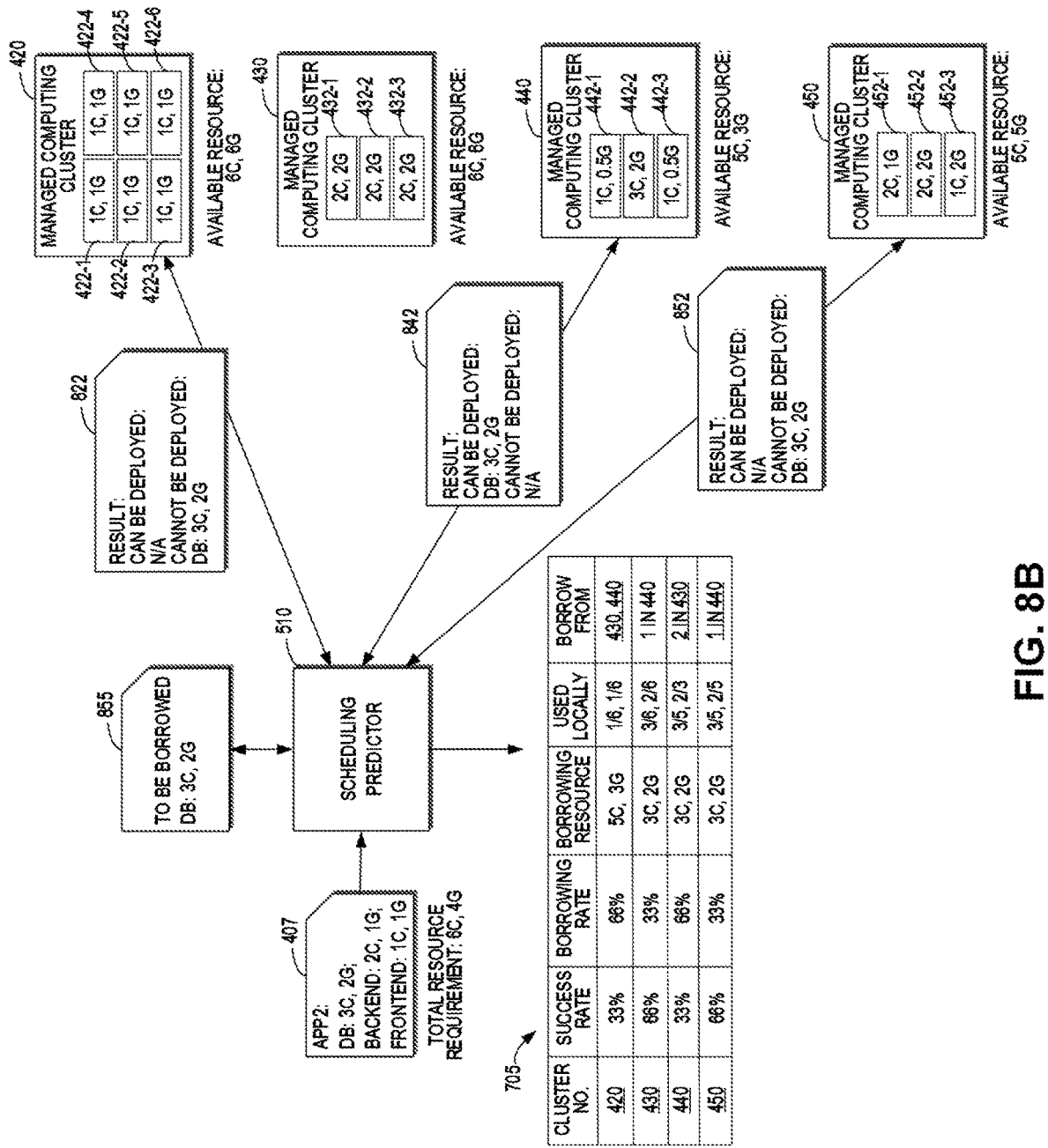

FIGS. 8A and 8B depict block diagrams of example interactions between the scheduling predictor 510 with the managed computing clusters of FIG. 7. In FIG. 8A, the scheduling predictor 510 sends, respectively to the managed computing clusters 420, 430, 440, and 450, information about the resource requirement of the application 407, such as information about respective resource requirements of the functions of the application 405 to the managed computing clusters. The managed computing clusters 420, 430, 440, and 450 may respectively determine whether the application 407 can be deployed thereon based on the received information. The managed computing clusters 420, 430, 440, and 450 then send predicted deployment results 820, 830, 840, and 850, respectively, to indicate whether the application 405 can be partially or successfully deployed on the corresponding managed computing clusters.

As illustrated, the predicted deployment result 820 from the managed computing cluster 420 indicates that the frontend function of the application 407 can be deployed on the managed computing cluster 420 because the available resource of any of the nodes 422-1 to 422-6 of this cluster can satisfy the resource requirement of the frontend function. The predicted deployment result 820 may alternatively or additionally indicate that the DB and backend functions of the application 407 fail to be deployed on this cluster because any of the nodes 422-1 to 422-6 have sufficient available resources to meet the resource requirements of the two functions.

The predicted deployment result 830 from the managed computing cluster 430 indicates that the frontend and backend functions of the application 407 can be deployed on the managed computing cluster 430 because two of the nodes 432-1 to 432-3 can have the two functions deployed thereon. The predicted deployment result 830 may alternatively or additionally indicate that the DB function of the application 407 fails to be deployed on this cluster.

The predicted deployment result 840 from the managed computing cluster 440 indicates that the DB function of the application 407 can be deployed on the managed computing cluster 440 because the available resource of the node 442-2 of this cluster can satisfy the resource requirement of the DB function. The predicted deployment result 840 may alternatively or additionally indicate that the frontend and backend functions of the application 407 fail to be deployed on this cluster. It is noted that it is the managed computing cluster 440's decision to determine which functions of the application 407 can be successfully deployed using the available resources of the nodes.

The predicted deployment result 850 from the managed computing cluster 450 indicates that the frontend and backend functions of the application 407 can be deployed on the managed computing cluster 450 because the available resource of the nodes 542-1 and 452-2 of this cluster can satisfy the resource requirements of the two functions respectively. The predicted deployment result 850 may alternatively or additionally indicate that the DB function of the application 407 fails to be deployed on this cluster.

In some embodiments, after receiving the predicted deployment results 820, 830, 840, and 850 from the managed computing clusters 420, 430, 440, and 450, the scheduling predictor 510 may analyze those predicted deployment results to generate the capability table 705. The factors in the capability table 705 may be determined in a similar way as discussed above for the capability table 507. In some embodiments, the scheduling predictor 510 determines, from the predicted deployment results 820, 830, 840, and 850, that none of the existing managed computing clusters can be used to fully and successfully deploy the application 407 (for example, the success rates are all below 100%). In such a case, for each or some of the managed computing clusters 420, 430, 440, and 450, the scheduling predictor 510 may determine from which other managed computing clusters available resources can be borrowed to fully deploy the application.

In some embodiments, the application scheduler 530 may determine, based on the deployment results 820, 830, 840, and 850, that two or more managed computing clusters may be selected to fully deploy the functions of the application 407. The deployment result 820, 830, 840, or 850 from one of the selected managed computing clusters 420, 430, 440, or 450 may indicate that at least one of the functions of the application 407 can be successfully deployed thereon. The combination of the two or more selected managed computing clusters may have all the functions of the applications 407 successfully deployed thereon.

In some embodiments, as an alternative, for a managed computing cluster, the scheduling predictor 510 may send further information about the resource requirement(s) of one or more functions of the application(s) which fail to be successfully deployed on a managed computing cluster to other managed computing clusters, in order to determine whether one or more other managed computing clusters can work together with the managed computing cluster to fully deploy the application 407.

Such further confirmation in term of deployment of one or more failed functions (not the whole application) may be beneficial in the cases that available resources of the managed computing clusters are dynamically changed and/or the managed computing clusters may make different decisions on the deployment of the application and the deployment of some individual functions of the application. For example, since one or more applications and/or functions may be deployed onto or un-deployed from a managed computing cluster, the available resources of this cluster may change over time. In addition, depending on the deployment policy, a managed computing cluster may indicate in a previous predicted deployment result that a first function of an application fails to be deployed because it decides to deploy a second function of the application on a node with available resources and thus has no sufficient available resource for the first function. If this managed computing cluster receives information about a resource requirement of the first function again from the hub computing cluster (without the resource requirement of the second function), it may determine that the first function can be successfully deployed thereon because the resource requirement of the first function can be satisfied with the available resources.

As illustrated in FIG. 8A, the "borrow from" column in the capability table 705 is empty after the scheduling predictor 510 receives the predicted deployment results 820, 830, 840, and 850. The scheduling predictor 510 may perform further interactions with the managed computing clusters to determine from which the resources can be borrowed. For example, for the managed computing cluster 430 on which the DB function of the application 407 cannot be deployed, the scheduling predictor 510 may predict whether available resources can be borrowed from the remaining managed computing clusters 420, 440, and 450 to fully deploy the application 407 with the managed computing cluster 430. FIG. 8B illustrates further interactions between the scheduling predictor 510 with the managed computing clusters 420, 440, and 450 to determine whether the DB function can be deployed thereon. The scheduling predictor 510 may determine and send information 855 about the resource requirement of the DB function to the remaining managed computing clusters 420, 440, and 450. The managed computing clusters 420, 440, and 450 may determine whether the DB function can be successfully deployed thereon based on the available resources of their nodes and the resource requirement of the DB function of the application 407.

As illustrated, predicted deployment results 822 and 852 from the managed computing clusters 420 and 450 indicate that the DB function cannot be deployed thereon, and a predicted deployment result 842 from the managed computing cluster 440 indicates that the DB function can be deployed thereon because the node 442-2 has available resource to meet the resource requirement of the DB function. Thus, the "borrow from" column of the capability table 705 indicates that resources from the managed computing cluster 440 can be borrowed by the managed computing cluster 430 for deploying one function of the application 407. The application 407 can thus be fully deployed on the two managed computing clusters 430 and 440.

In some embodiments, the scheduling predictor 510 may determine, for each managed computing cluster, other managed computing clusters from which the resources can be borrowed for fully deploying the application 407. The other managed computing clusters from which resources are to be borrowed for each managed computing cluster are listed in the "borrow from" column of the capability table 705, as illustrated in FIG. 8B.

In some embodiments, the scheduling predictor 510 may not determine the managed computing clusters from which the resources can be borrowed for each managed computing cluster. Instead, the scheduling predictor 510 may request the application scheduler 530 to select one of the managed computing cluster based on the predicted deployment results 820, 830, 840, and 850 (or based on the factors of "success rate," "borrowing rate," "borrowing resource," and "locally used" columns of the capability table 705 determined from the predicted deployment results 820, 830, 840, and 850). The application scheduler 530 may select the managed computing cluster using its deployment policy. For example, the application scheduler 530 may select the managed computing cluster 430 because it has a relatively high success rate of deploying the application 407 and a relatively large amount of available resource left after the application 407 is deployed. After the managed computing cluster 430 is selected as a target managed computing cluster for deploying the application 407, the scheduling predictor 510 may further determine one or more other managed computing clusters from which resources can be borrowed to fully deploy the application 407 together with the managed computing cluster 430.

In the example of FIG. 8B, since the predicted deployment result 842 from the managed computing cluster 440 indicates that the DB function can be successfully deployed thereon, the scheduling predictor 510 may thus determine that resources can be borrowed from the managed computing cluster 440 to deploy the DB function of the application 407 (which function cannot be deployed on the managed computing cluster 405).

In some embodiments, if an application is to be deployed on two or more managed computing clusters, one of the managed computing clusters may be configured as a target managed computing cluster for the application, and the other managed computing clusters may be considered as borrowed computing cluster(s) from which the target managed computing cluster borrows resources for fully deploying the application. For example, the managed computing cluster 430 may be configured as the target managed computing cluster for the application 407 and the managed computing cluster 440 may be considered as a borrowed managed computing cluster.

In some cases, there may not be network access for different managed computing clusters which can enable application isolation among the managed computing clusters. However, if two or more managed computing clusters are selected for deploying different function of an application, different functions of the same application may need to communicate with each other to convey data or information. The hub computing cluster 505 of the present disclosure include the sharing controller 520 to support the application deployment across more than one managed computing cluster.

Figure 9:
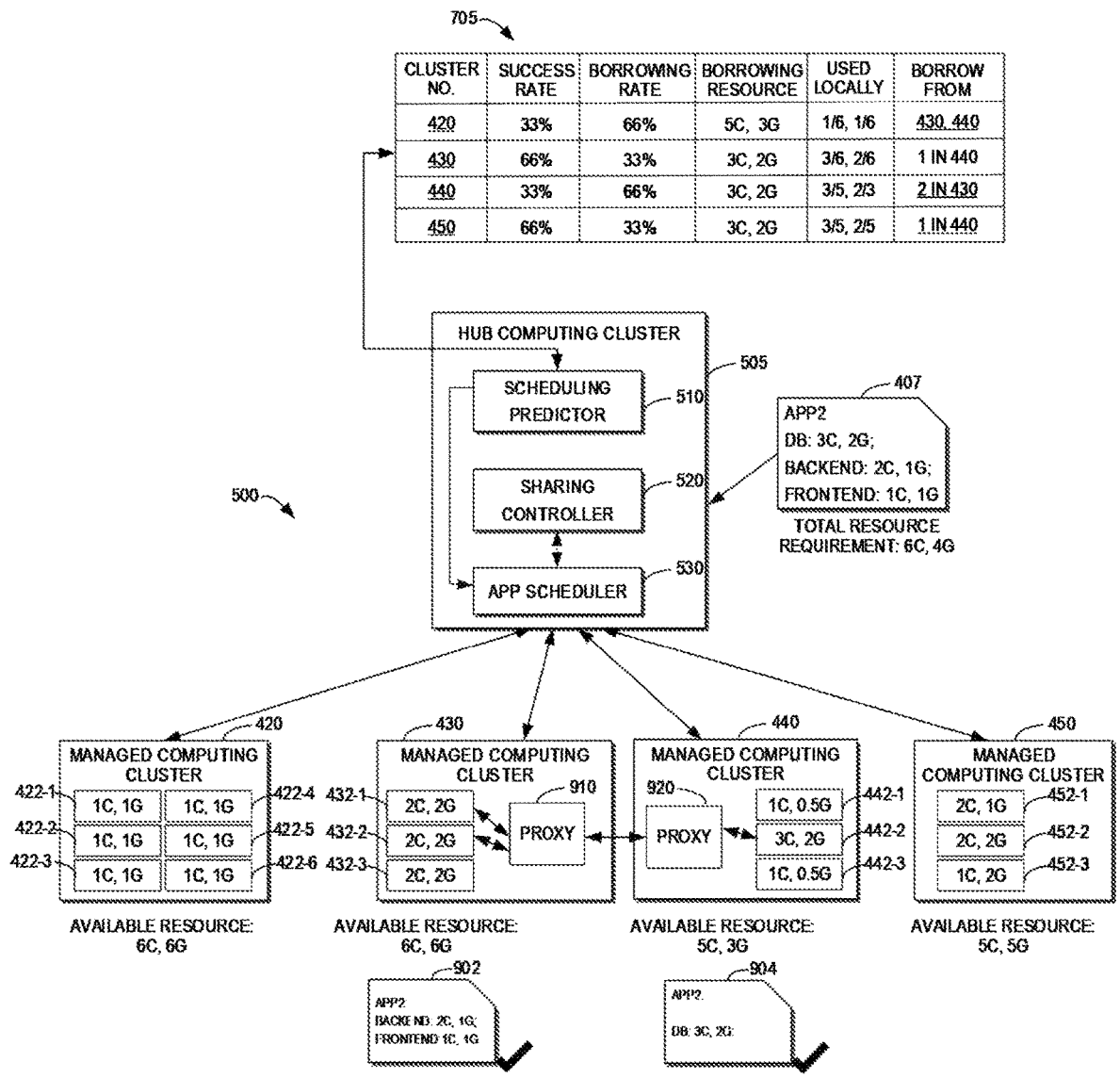
FIG. 9 depicts a block diagram of an example of deploying an application on more than one managed computing cluster in accordance with some other embodiments of the present disclosure.

FIG. 9 illustrates an example block diagram for application deployment across more than one managed computing cluster in accordance with some other embodiments of the present disclosure. In these embodiments, it is assumed that according to the capability table 705, the hub computing cluster 505 selects the managed computing clusters 430 and 440 to deploy the application 407.

The sharing controller 520 may split the application 407 into two application portions 902 and 904. The application portion 902 is configured to implement the backend and frontend functions, and the application portion 904 is configured to implement the DB function. The application scheduler 530 may deploy the application portion 902 to the managed computing cluster 430 and deploy the application portion 904 to the managed computing cluster 440. When actually deploying the application portions, the resource requirements of the corresponding functions may be sent to the managed computing clusters 430 and 440 to allow the two clusters to complete the deployment.

In some embodiments, in addition to deploying an application portion of the application, one of the managed computing clusters 430 and 440 may also be notified of the deployment of the other application portion on the other one of the managed computing clusters 430 and 440. For example, the managed computing cluster 430 may be notified by the application scheduler 530 of the cluster identity of the managed computing cluster 440, the function name(s) of the functions to be deployed on the managed computing cluster 440, the resource requirement of the functions to be deployed on the managed computing cluster 440. In addition, the managed computing cluster 440 may also be notified of the similar information about the functions to be deployed on the managed computing cluster 430.

In addition, the sharing controller 520 may further deploy a proxy 910 on the managed computing cluster 430 and deploy a proxy 920 on the managed computing cluster 440 to enable communication between the at least one first function and the at least one second function. The proxies 910 and 920 are especially required if the managed computing clusters 430 and 440 has no network access therebetween.

The proxies 910 and 920 can covey data or information to be communicated between the functions of the application 407 in different managed computing clusters. In some embodiments, each of the proxies 910 and 920 may create a domain name system (DNS) entry and create ingress and egress endpoints for the function(s) deployed on the managed computing cluster. One of the proxies 910 and 920 may convey data or information to the other one of the proxies 910 and 920 based on a host name and a domain name related to the function(s) deployed on the other managed computing cluster. For example, data or information transmitted from the frontend/backend function to the DB function may be received by the proxy 910 from the node 432-1 or 432-2 (on which the two functions are deployed), and sent to the proxy 920. The host name of the node 442-2 and the DNS created by the proxy 920 may be used to identify the destination of the data or information to be transmitted to the DB function deployed on the managed computing cluster 440.

By deploying the proxies on the managed computing cluster, it is possible to enable communications between functions within an application and at the same time maintain the communication isolation for applications deployed on the managed computing clusters.

In some embodiments, if the managed computing cluster 430 is configured as a target managed computing cluster for the application 407 and it is found that there are sufficient available resources of the managed computing cluster 430 to meet the resource requirement of the DB function, the hub computing cluster 505, e.g., the application scheduler 530, may un-deploy the DB function from the managed computing cluster 440 and re-deploy this function on the managed computing cluster 430. In addition, the application scheduler 530 may un-deploy the proxies 910 and 920 from the managed computing clusters 430 and 440. As a result, the application 407 can be fully deployed on a single managed computing cluster. In addition, as the DB function is un-deployed from the managed computing cluster 440, the resource on this cluster may be released and used to deploy one or more other functions/applications.

It would be appreciated that although application deployment across two managed computing clusters is illustrated and discussed above, in some embodiments, an application can be split and deployed on more than two managed computing clusters. In the case that the application is split to more than two managed computing clusters, proxies can be deployed in each of the managed computing clusters to facilitate communications between each two managed computing clusters.

Figure 10:
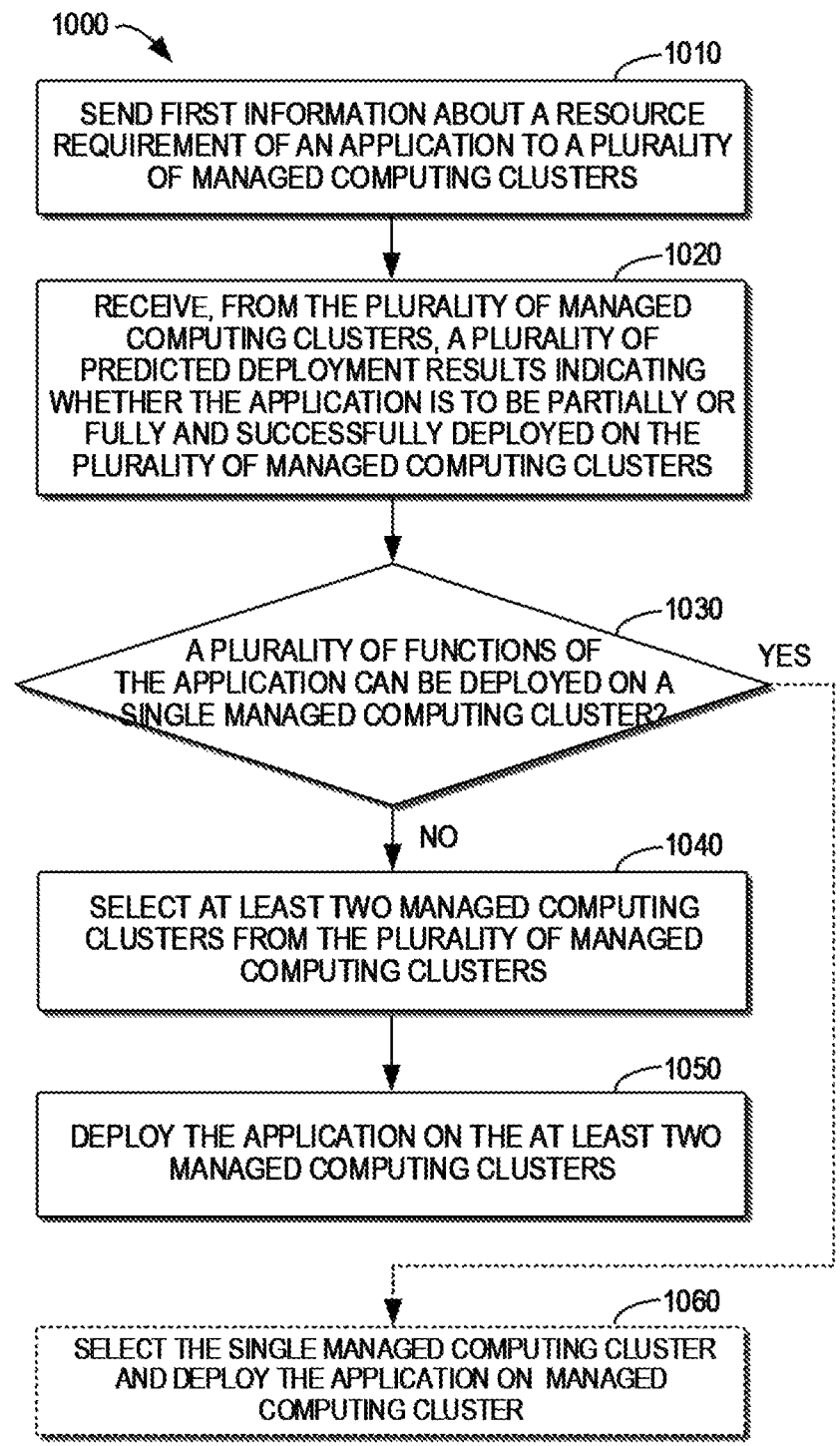
FIG. 10 depicts a flowchart of an example method in accordance with some embodiments of the present disclosure.

FIG. 10 shows a flowchart of an example method 1000 in accordance with some embodiments of the present disclosure. The method 1000 can be implemented at the hub computing cluster 505. For the purpose of discussion, the method 1000 will be described from the perspective of the hub computing cluster 505.

At block 1010, the hub computing cluster 505 sends first information about a resource requirement of an application to a plurality of managed computing clusters. At block 1020, the hub computing cluster 505 receives, from the plurality of managed computing clusters, a plurality of predicted deployment results indicating whether the application is to be partially or fully and successfully deployed on the plurality of managed computing clusters. At block 1030, the hub computing cluster 505 determines, from the plurality of predicted deployment results, whether a plurality of functions of the application can be deployed on a single one of the plurality of managed computing clusters.

If it is determined that a plurality of functions of the application fail to be deployed on a single one of the plurality of managed computing clusters, at block 1040, the hub computing cluster 505 selects at least two managed computing clusters from the plurality of managed computing clusters. At block 1050, the hub computing cluster 505 deploys the application on the at least two managed computing clusters.

In some embodiments, if it is determined that the plurality of functions of the application can be deployed on a single one of the plurality of managed computing clusters, which means that the application can fully and successfully deployed on the third managed computing cluster, at block 1060, the hub computing cluster 505 selects the managed computing cluster (sometimes referred to as a "third managed computing cluster") and deploy the application on the managed computing cluster.

In some embodiments, the first information comprises information about respective resource requirements of the plurality of functions of the application. In some embodiments, the plurality of predicted deployment results indicate whether respective functions of the plurality of functions are to be successfully deployed on the plurality of managed computing clusters.

In some embodiments, the predicted deployment result for a managed computing cluster indicates at least one of the following: a success rate of deploying the application on the managed computing cluster, available resource usage of deploying the application on the managed computing cluster, a borrowing rate of resources to be borrowed from at least one other managed computing cluster of the plurality of managed computing clusters for fully deploying the application, at least one resource amount to be borrowed from the at least one other managed computing cluster, and the at least one other managed computing cluster from which the resources are to be borrowed.

Figure 11:
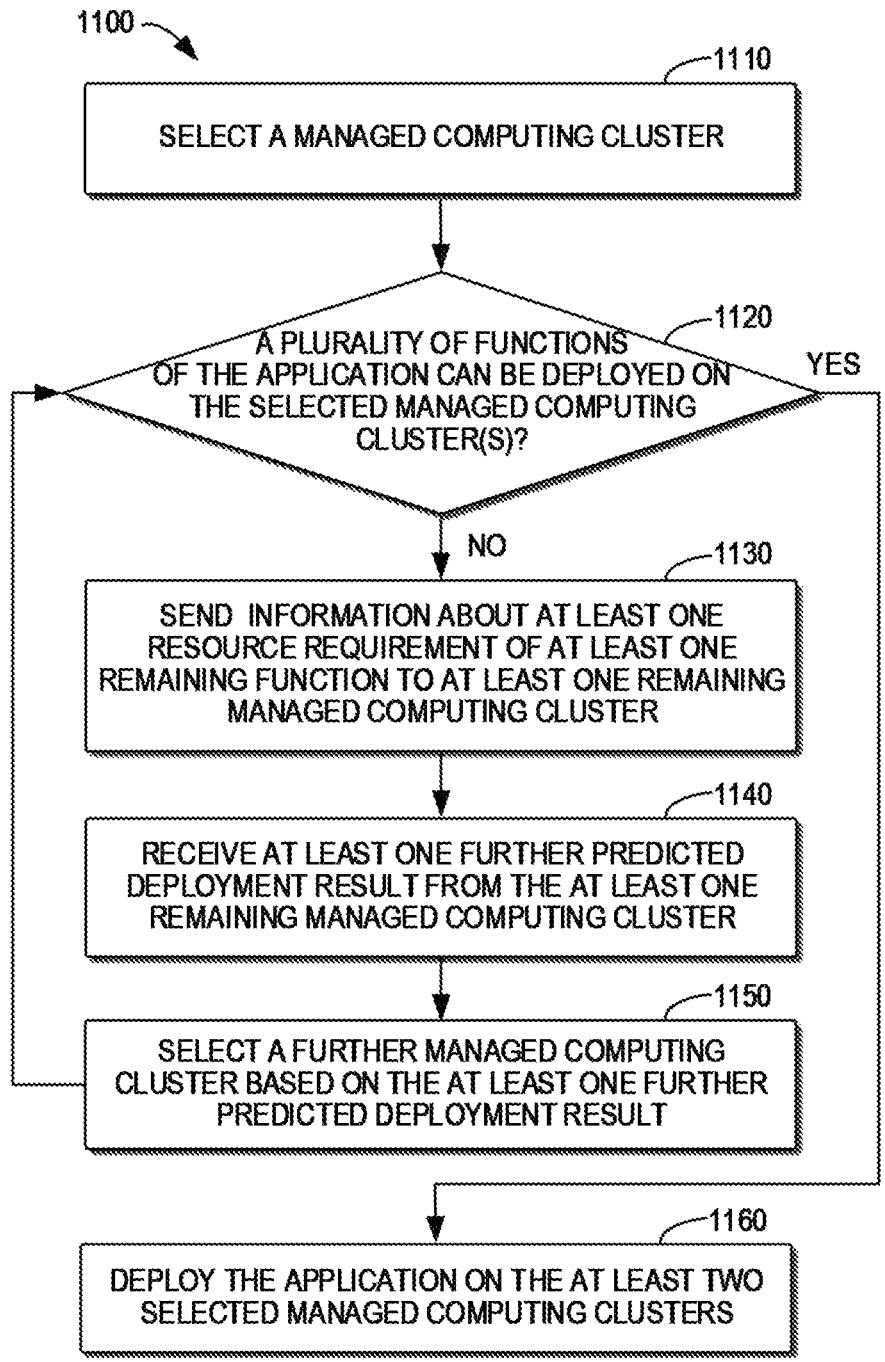
FIG. 11 depicts a flowchart of an example process for managed computing cluster selection in accordance with some embodiments of the present disclosure.

In some embodiments, depending on the plurality of predicted deployment results, different application deployment schemas may be applied. FIG. 11 depicts a flowchart of an example process 1100 for managed computing cluster selection in accordance with some embodiments of the present disclosure. The process 1100 may be considered as some embodiments of the selecting at block 1040 of the method 1000, and thus may be implemented at the hub computing cluster 505.

At block 1110, the hub computing cluster 505 selects a managed computing cluster from the plurality of managed computing clusters depending on the already received predicted deployment result. The predicted deployment result from the selected managed computing cluster indicates that at least one first function of the plurality of functions is to be successfully deployed on the selected managed computing cluster.

At block 1120, the hub computing cluster 505 determines whether the plurality of functions of the application can be deployed on the currently selected managed computing cluster(s). As the plurality of functions cannot be fully deployed on any of the plurality of managed computing clusters, the managed computing cluster selected at block 1110 cannot have the plurality of functions all deployed thereon and there may be at least one remaining function which cannot be deployed on the selected managed computing cluster(s). Then, at block 1130, the hub computing cluster 505 sends information about at least one resource requirement of at least one remaining function to at least one remaining managed computing cluster that is not selected.

At block 1140, the hub computing cluster 505 receives at least one further predicted deployment result from the at least one remaining managed computing cluster. The at least one further predicted deployment result indicates whether the at least one remaining function is to be successfully deployed on the at least one remaining managed computing cluster. At block 1150, the hub computing cluster 505 selects a further managed computing cluster from the at least one remaining managed computing cluster based on the at least one further predicted deployment result. The further predicted deployment result from the further selected managed computing cluster indicates that one or more functions of the at least one remaining function are to be successfully deployed on the further selected managed computing cluster.

With a further managed computing cluster selected, the hub computing cluster 505 may proceed to block 1120 to further determine whether the plurality of functions of the application can be deployed on the currently selected managed computing cluster(s). If there is still one or more functions cannot be deployed on the two or more selected managed computing clusters according to the (further) predicted deployment results received from the managed computing clusters, the hub computing cluster 505 may continue to perform operations at blocks 1130 to 1150 to select one or more further managed computing clusters.

If the plurality of functions of the application can be split and successfully deployed on the two or more selected managed computing clusters, at block 1160, the hub computing cluster 505 deploy the application on the two or more selected managed computing clusters.

In some embodiments where at least two managed computing clusters are selected, the hub computing cluster may deploy at least one first function on a first managed computing cluster of the at least two selected managed computing clusters the based on at least one resource requirement of the at least one first function, where the predicted deployment result from the first managed computing cluster indicates that at least one first function is to be successfully deployed on the first managed computing cluster. In addition, the hub computing cluster 505 may deploy at least one second function on a second managed computing cluster of the at least two selected managed computing clusters based on at least one resource requirement of the at least one second function, where the predicted deployment result from the second managed computing cluster indicates that at least one second function is to be successfully deployed on the second managed computing cluster. Further, the hub computing cluster 505 may deploy a first proxy on the first managed computing cluster and a second proxy on the second managed computing cluster to enable communication between the at least one first function and the at least one second function.

In some embodiments, in accordance with a determination that an available resource of the first managed computing cluster meets at least one resource requirement of the at least one second function, the hub computing cluster 505 may un-deploy the at least one second function from the second managed computing cluster, re-deploy the at least one second function on the first managed computing cluster, and un-deploy the first proxy from the first managed computing cluster and the second proxy from the second managed computing cluster.

It should be noted that the processing of application deployment according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    sending, by one or more processors, first information about a resource requirement of an application to a plurality of managed computing clusters, wherein the application includes a plurality of functions;
    receiving, by the one or more processors, from each managed computing cluster, a predicted deployment result indicating whether a respective managed computing cluster can satisfy the resource requirement of the application;
    determining, from a plurality of the predicted deployment results that are received from the plurality of managed computing clusters, whether the application can be deployed on a single managed computing cluster;
    selecting, by the one or more processors, at least two managed computing clusters from the plurality of managed computing clusters based on the plurality of predicted deployment results when the application cannot be deployed on the single managed computing cluster; and
    deploying, by the one or more processors, at least one function of the plurality of functions of the application on each of the at least two managed computing clusters.

2. The method of claim 1, wherein the first information comprises information about respective resource requirements of the plurality of functions of the application, and wherein the plurality of predicted deployment results indicates whether respective functions of the plurality of functions can be successfully deployed on the plurality of managed computing clusters.

3. The method of claim 1, wherein the predicted deployment result for a managed computing cluster indicates at least one of the following: a success rate of deploying the application on the managed computing cluster, available resource usage of deploying the application on the managed computing cluster, a borrowing rate of resources to be borrowed from at least one other managed computing cluster of the plurality of managed computing clusters for fully deploying the application, at least one resource amount to be borrowed from the at least one other managed computing cluster, and the at least one other managed computing cluster from which the resources are to be borrowed.

4. The method of claim 1, wherein the selecting the at least two managed computing clusters comprises:
selecting, by the one or more processors, a first managed computing cluster from the plurality of managed computing clusters, the predicted deployment result from the first managed computing cluster indicating that at least one first function of the plurality of functions can be successfully deployed on the first managed computing cluster;
sending, by the one or more processors, second information about at least one resource requirement of at least one remaining function of the plurality of functions to at least one remaining managed computing cluster of the plurality of managed computing clusters;
receiving, by the one or more processors, from the at least one remaining managed computing cluster, at least one further predicted deployment result indicating whether the at least one remaining function can be successfully deployed on the at least one remaining managed computing cluster; and
selecting, by the one or more processors, a second managed computing cluster from the at least one remaining managed computing cluster, the further predicted deployment result from the second managed computing cluster indicating that at least one second function of the at least one remaining function can be successfully deployed on the second managed computing cluster.

5. The method of claim 4, further comprising:
deploying, by the one or more processors, the at least one first function on the first managed computing cluster based on at least one resource requirement of the at least one first function;
deploying, by the one or more processors, the at least one second function on the second managed computing cluster based on at least one resource requirement of the at least one second function; and
deploying, by the one or more processors, a first proxy on the first managed computing cluster and a second proxy on the second managed computing cluster to enable communication between the at least one first function and the at least one second function.

6. The method of claim 5, further comprising:
in accordance with a determination that an available resource of the first managed computing cluster meets the at least one resource requirement of the at least one second function, un-deploying, by the one or more processors, the at least one second function from the second managed computing cluster,
re-deploying, by the one or more processors, the at least one second function on the first managed computing cluster, and
un-deploying, by the one or more processors, the first proxy from the first managed computing cluster and the second proxy from the second managed computing cluster.

7. The method of claim 1, further comprising:
in accordance with a determination, from the plurality of predicted deployment results, that the plurality of functions of the application can be deployed on a third managed computing cluster of the plurality of managed computing clusters, selecting, by the one or more processors, the third managed computing cluster; and
deploying, by the one or more processors, the application on the third managed computing cluster.

8. A computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
sending first information about a resource requirement of an application to a plurality of managed computing clusters, wherein the application includes a plurality of functions;
receiving from each managed computing cluster, predicted deployment result indicating whether a respective managed computing cluster can satisfy the resource requirement of the application;
determining, from a plurality of the predicted deployment results that are received from the plurality of managed computing clusters, whether the application can be deployed on a single managed computing cluster;
selecting at least two managed computing clusters from the plurality of managed computing clusters based on the plurality of predicted deployment results when the application cannot be deployed on the single managed computing cluster; and
deploying at least one function of the plurality of functions of the application on each of the at least two managed computing clusters.

9. The computer system of claim 8, wherein the first information comprises information about respective resource requirements of the plurality of functions of the application, and wherein the plurality of predicted deployment results indicate whether respective functions of the plurality of functions can be successfully deployed on the plurality of managed computing clusters.

10. The computer system of claim 8, wherein the predicted deployment result for a managed computing cluster indicates at least one of the following: a success rate of deploying the application on the managed computing cluster, available resource usage of deploying the application on the managed computing cluster, a borrowing rate of resources to be borrowed from at least one other managed computing cluster of the plurality of managed computing clusters for fully deploying the application, at least one resource amount to be borrowed from the at least one other managed computing cluster, and the at least one other managed computing cluster from which the resources are to be borrowed.

11. The computer system of claim 8, wherein the selecting the at least two managed computing clusters comprises:
selecting a first managed computing cluster from the plurality of managed computing clusters, the predicted deployment result from the first managed computing cluster indicating that at least one first function of the plurality of functions can be successfully deployed on the first managed computing cluster;
sending second information about at least one resource requirement of at least one remaining function of the plurality of functions to at least one remaining managed computing cluster of the plurality of managed computing clusters;
receiving, from the at least one remaining managed computing cluster, at least one further predicted deployment result indicating whether the at least one remaining function can be successfully deployed on the at least one remaining managed computing cluster; and selecting a second managed computing cluster from the at least one remaining managed computing cluster, the further predicted deployment result from the second managed computing cluster indicating that at least one second function of the at least one remaining function can be successfully deployed on the second managed computing cluster.

12. The computer system of claim 11, further comprising:
deploying the at least one first function on the first managed computing cluster based on at least one resource requirement of the at least one first function;
deploying the at least one second function on the second managed computing cluster based on at least one resource requirement of the at least one second function; and
deploying a first proxy on the first managed computing cluster and a second proxy on the second managed computing cluster to enable communication between the at least one first function and the at least one second function.

13. The computer system of claim 12, further comprising:
in accordance with a determination that an available resource of the first managed computing cluster meets the at least one resource requirement of the at least one second function, un-deploying the at least one second function from the second managed computing cluster;
re-deploying the at least one second function on the first managed computing cluster; and
un-deploying the first proxy from the first managed computing cluster and the second proxy from the second managed computing cluster.

14. The computer system of claim 11, further comprising:
in accordance with a determination, from the plurality of predicted deployment results, that the plurality of functions of the application can be deployed on a third managed computing cluster of the plurality of managed computing clusters, selecting the third managed computing cluster; and
deploying the application on the third managed computing cluster.

15. A computer program product comprising:
a computer-readable storage device storing computer-readable program code embodied therewith, the computer-readable program code comprising program code executable by a computer to perform a method comprising:
sending first information about a resource requirement of an application to a plurality of managed computing clusters, wherein the application includes a plurality of functions;
receiving from each managed computing cluster, a predicted deployment result indicating whether a respective managed computing cluster can satisfy the resource requirement of the application;
determining, from a plurality of the predicted deployment results that are received from the plurality of managed computing clusters, whether the application can be deployed on a single managed computing cluster;
selecting at least two managed computing clusters from the plurality of managed computing clusters based on the plurality of predicted deployment results when the application cannot be deployed on the single managed computing cluster; and
deploying at least one function of the plurality of functions of the application on each of the at least two managed computing clusters.

16. The computer program product of claim 15, wherein the first information comprises information about respective resource requirements of the plurality of functions of the application, and wherein the plurality of predicted deployment results indicate whether respective functions of the plurality of functions can be successfully deployed on the plurality of managed computing clusters.

17. The computer program product of claim 15, wherein the predicted deployment result for a managed computing cluster indicates at least one of the following: a success rate of deploying the application on the managed computing cluster, available resource usage of deploying the application on the managed computing cluster, a borrowing rate of resources to be borrowed from at least one other managed computing cluster of the plurality of managed computing clusters for fully deploying the application, at least one resource amount to be borrowed from the at least one other managed computing cluster, and the at least one other managed computing cluster from which the resources are to be borrowed.

18. The computer program product of claim 15, wherein the selecting the at least two managed computing clusters comprises:
selecting a first managed computing cluster from the plurality of managed computing clusters, the predicted deployment result from the first managed computing cluster indicating that at least one first function of the plurality of functions can be successfully deployed on the first managed computing cluster;
sending second information about at least one resource requirement of at least one remaining function of the plurality of functions to at least one remaining managed computing cluster of the plurality of managed computing clusters;
receiving, from the at least one remaining managed computing cluster, at least one further predicted deployment result indicating whether the at least one remaining function can be successfully deployed on the at least one remaining managed computing cluster; and
selecting a second managed computing cluster from the at least one remaining managed computing cluster, the further predicted deployment result from the second managed computing cluster indicating that at least one second function of the at least one remaining function can be successfully deployed on the second managed computing cluster.

19. The computer program product of claim 18, further comprising:
in accordance with a determination that an available resource of the first managed computing cluster meets the at least one resource requirement of the at least one second function, un-deploying the at least one second function from the second managed computing cluster; and
re-deploying the at least one second function on the first managed computing cluster.

20. The computer program product of claim 15, further comprising:
in accordance with a determination, from the plurality of predicted deployment results, that the plurality of functions of the application can be deployed on a third managed computing cluster of the plurality of managed computing clusters, selecting the third managed computing cluster; and deploying the application on the third managed computing cluster.

\* \* \* \* \*